(12) United States Patent
Hamade et al.

(10) Patent No.: US 12,013,547 B2
(45) Date of Patent: Jun. 18, 2024

(54) OPTICAL MODULE, ELECTRO-OPTICAL DEVICE AND IMAGE DISPLAY DEVICE

(71) Applicant: SEIKO EPSON CORPORATION, Tokyo (JP)

(72) Inventors: Yuiga Hamade, Matsumoto (JP); Takumi Kodama, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 57 days.

(21) Appl. No.: 17/586,952

(22) Filed: Jan. 28, 2022

(65) Prior Publication Data

US 2022/0244554 A1 Aug. 4, 2022

(30) Foreign Application Priority Data

Jan. 29, 2021 (JP) ................. 2021-012993

(51) Int. Cl.
*G02B 27/12* (2006.01)
*G09G 3/34* (2006.01)

(52) U.S. Cl.
CPC ........... *G02B 27/126* (2013.01); *G09G 3/344* (2013.01); *G09G 2310/06* (2013.01); *G09G 2310/08* (2013.01)

(58) Field of Classification Search
None
See application file for complete search history.

(56) References Cited

U.S. PATENT DOCUMENTS

| 2012/0025732 A1 | 2/2012 | Hamaguchi | |
|---|---|---|---|
| 2013/0128611 A1* | 5/2013 | Akutsu | G03H 1/0248 |
| | | | 359/629 |
| 2020/0278559 A1* | 9/2020 | Hamade | G03B 21/00 |

FOREIGN PATENT DOCUMENTS

| CN | 1949351 A | * | 4/2007 | .......... G09G 3/3413 |
|---|---|---|---|---|
| CN | 107833560 A | * | 3/2018 | ....... G02F 1/133528 |
| JP | 2000-275732 A | | 10/2000 | |
| JP | 2008-225188 A | | 9/2008 | |
| JP | 2012-32453 A | | 2/2012 | |
| JP | 2016-38935 A | | 3/2016 | |

* cited by examiner

*Primary Examiner* — Bao-Luan Q Le
*Assistant Examiner* — Danell L Owens
(74) *Attorney, Agent, or Firm* — Oliff PLC

(57) ABSTRACT

An optical module according to the present disclosure includes a first electro-optical device having a first light-emitting element emitting light including a first wavelength region, and a first light-emitting control transistor provided corresponding to the first light-emitting element, a second electro-optical device having a second light-emitting element emitting light including a second wavelength region shorter than the first wavelength region, and a second light-emitting control transistor provided corresponding to the second light-emitting element, and a prism configured to synthesize light emitted from the first electro-optical device, and light emitted from the second electro-optical device, wherein a first period in which the first light-emitting control transistor is in an ON-state in one frame is shorter than a second period in which the second light-emitting control transistor is in an ON-state in the one frame.

18 Claims, 15 Drawing Sheets

| PANEL COLOR | Red | Green | Blue |
|---|---|---|---|
| CHROMATICITY (x, y) | (0.68, 0.32) | (0.23, 0.74) | (0.14, 0.05) |
| VISUAL LUMINANCE (cd/m²) | 1372 | 3272 | 356 |
| LT50 (HOUR) | 600 | 400 | 300 |

| VISUAL LUMINANCE (cd/m²) | DUTY RATIO (%) | DRIVE LUMINANCE (cd/m²) | LT50 (HOUR) |
|---|---|---|---|
| 3272 | 10 | 32720 | 63 |
|  | 20 | 16360 | 110 |
|  | 50 | 6544 | 230 |
|  | 67 | 4908 | 289 |
|  | 100 | 3272 | 400 |

| DUTY RATIO | LT50 (HOUR) |
|---|---|
| 10% | 95 |
| 20% | 166 |
| 30% | 229 |
| 40% | 288 |
| 50% | 345 |
| 60% | 399 |
| 70% | 451 |
| 80% | 502 |
| 90% | 551 |
| 100% | 600 |

FIG. 10

| LEVEL | PANEL | DUTY RATIO | Δu'v' @LT50 |
|---|---|---|---|
| EXAMPLE 1 | RED | 42% | <0.001 |
| | GREEN | 70% | |
| | BLUE | 100% | |
| EXAMPLE 2 | RED | 30% | 0.018 |
| | GREEN | 70% | |
| | BLUE | 100% | |
| EXAMPLE 3 | RED | 60% | 0.019 |
| | GREEN | 70% | |
| | BLUE | 100% | |
| COMPARATIVE EXAMPLE 1 | RED | 100% | 0.026 |
| | GREEN | 100% | |
| | BLUE | 100% | |
| COMPARATIVE EXAMPLE 2 | RED | 29% | 0.021 |
| | GREEN | 70% | |
| | BLUE | 100% | |
| COMPARATIVE EXAMPLE 3 | RED | 61% | 0.021 |
| | GREEN | 70% | |
| | BLUE | 100% | |

FIG. 11

OPTICAL MODULE, ELECTRO-OPTICAL DEVICE AND IMAGE DISPLAY DEVICE

The present application is based on, and claims priority from JP Application Serial Number 2021-012993, filed Jan. 29, 2021, the disclosure of which is hereby incorporated by reference herein in its entirety.

BACKGROUND

1. Technical Field

The present disclosure relates to an optical module, an electro-optical device, and an image display device.

2. Related Art

In the past, an optical module has been known that includes a plurality of electro-optical devices that emit imaging light having different colors from each other, and a prism that synthesizes the imaging light emitted from the plurality of electro-optical devices. As the electro-optical device, a light-emitting type electro-optical device such as an organic electro luminescence (EL) panel has been known. An optical module of this sort has been used in image display devices such as a head-mounted display and a projector in the past.

JP 2012-32453 A discloses a technique that focuses on a maximum emission efficiency of a light emitting material of each color, for a light emitting material having a color for which luminance required for white display cannot be obtained with current density at the maximum emission efficiency, applies current density higher than current density at the maximum emission efficiency, and maximizes a drive duty ratio of the light emitting material. This existing technique applies current density at the maximum emission efficiency to a light emitting material having a color for which luminance required for white display with current density at the maximum emission efficiency can be obtained, and sets a drive duty ratio of the light emitting material to equal to or less than 100%.

According to the above-described existing technique, power consumption when white display is performed can be suppressed most. However, deterioration characteristics (lifetime characteristics) of a light emission material differ depending on a wavelength region of light emitted by the light emission material. In other words, when imaging light is generated using a plurality of light emission materials that emit light in different wavelength regions, deterioration rates of the respective light emission materials differ due to lifetime characteristics of the respective light emission materials being different, and thus when imaging light of mixed colors (in particular, white imaging light) is generated, color shifting is generated in the imaging light.

SUMMARY

To solve the above problem, an optical module according to an aspect of the present disclosure includes a first electro-optical device having a first light-emitting element emitting light including a first wavelength region, and a first light-emitting control transistor provided corresponding to the first light-emitting element, a second electro-optical device having a second light-emitting element emitting light including a second wavelength region shorter than the first wavelength region, and a second light-emitting control transistor provided corresponding to the second light-emitting element, and a prism configured to synthesize light emitted from the first electro-optical device, and light emitted from the second electro-optical device, wherein a first period in which the first light-emitting control transistor is in an ON-state in one frame is shorter than a second period in which the second light-emitting control transistor is in an ON-state in the one frame.

An electro-optical device according to an aspect of the present disclosure includes a first pixel configured to emit light including a first wavelength region, and a second pixel configured to emit light including a second wavelength region shorter than the first wavelength region, wherein the first pixel includes a first light-emitting element, and a first light-emitting control transistor provided corresponding to the first light-emitting element, the second pixel includes a second light-emitting element, and a second light-emitting control transistor provided corresponding to the second light-emitting element, and a first period in which the first light-emitting control transistor is in an ON-state in one frame is shorter than a second period in which the second light-emitting control transistor is in an ON-state in the one frame.

An image display device according to an aspect of the present disclosure includes an optical module according to an aspect of the present disclosure, or an electro-optical device according to an aspect of the present disclosure.

BRIEF DESCRIPTION OF THE DRAWINGS

FIG. 10 is a diagram showing a relationship between drive duty ratios of the first light-emitting element and luminance half-lives of the first electro-optical device.

FIG. 11 is a diagram showing a result of researching a relationship among Δu'v', which is an evaluation index of color shifting, a drive duty ratio of the first light-emitting element, a drive duty ratio of the second light-emitting element, and a drive duty ratio of the third light-emitting element, for each of three examples and three comparative examples.

DESCRIPTION OF EXEMPLARY EMBODIMENTS

Figure 1:
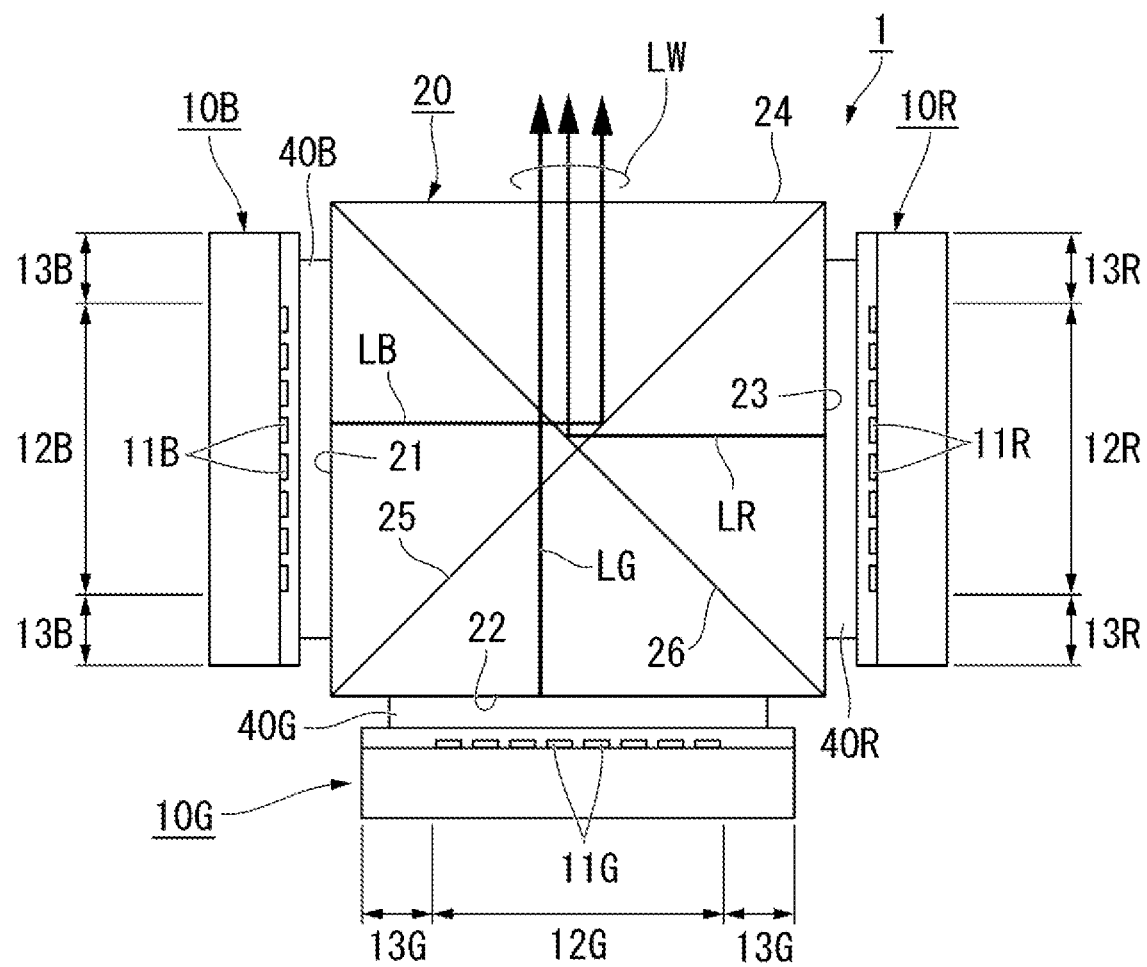
FIG. 1 is a schematic configuration diagram of an optical module in an exemplary embodiment of the present disclosure.

An exemplary embodiment of the present disclosure will be described below with reference to the accompanying drawings.

Note that, in the drawings, the dimensions of some components may be scaled differently for ease of understanding for the components.

Optical Module

FIG. 1 is a schematic configuration diagram of an optical module 1 in an exemplary embodiment of the present disclosure. As illustrated in FIG. 1, the optical module 1 includes a first electro-optical device 10R, a second electro-optical device 10B, a third electro-optical device 10G, and a dichroic prism 20 (prism).

The first electro-optical device 10R is a light-emitting type electro-optical device that emits first imaging light LR to the dichroic prism 20. The second electro-optical device 10B is a light-emitting type electro-optical device that emits second imaging light LB to the dichroic prism 20. The third electro-optical device 10G is a light-emitting type electro-optical device that emits third imaging light LG to the dichroic prism 20. A light-emitting type electro-optical device is a device that generates light by itself with electrical energy provided from an outside, without requiring a light source such as a backlight. In the present exemplary embodiment, the first electro-optical device 10R, the second electro-optical device 10B, and the third electro-optical device 10G are each an electro luminescence (EL) panel, for example.

The first electro-optical device 10R has a plurality of first pixels 11R. The plurality of first pixels 11R are arranged in a matrix on a substrate of the first electro-optical device 10R. The first pixel 11R emits light in a first wavelength region. In the present exemplary embodiment, the light in the first wavelength region is red light. That is, the first wavelength region includes, for example, wavelengths from 610 nm to 680 nm. In the following description, the light in the first wavelength region may be referred to as "red light". The first imaging light LR emitted from the first electro-optical device 10R includes red light emitted from each of the plurality of first pixels 11R. Accordingly, the first imaging light LR is also imaging light in the first wavelength region, that is, red imaging light.

The first electro-optical device 10R has a first pixel area 12R including the plurality of first pixels 11R arranged in a matrix, and a first non-pixel area 13R surrounding the first pixel area 12R. The first electro-optical device 10R is bonded to a red light incident surface 23 via a first adhesive layer 40R, which is transmissive, in a state of facing the red light incident surface 23 of the dichroic prism 20. In other words, the first electro-optical device 10R is arranged such that the first imaging light LR is perpendicularly incident to the red light incident surface 23.

The second electro-optical device 10B has a plurality of second pixels 11B. The plurality of second pixels 11B are arranged in a matrix on a substrate of the second electro-optical device 10B. The second pixel 11B emits light in a second wavelength region shorter than the first wavelength region. In the present exemplary embodiment, the light in the second wavelength region is blue light. That is, the second wavelength region includes, for example, wavelengths from 450 nm to 490 nm. In the following description, the light in the second wavelength region may be referred to as "blue light". The second imaging light LB emitted from the second electro-optical device 10B includes blue light emitted from each of the plurality of second pixels 11B. Accordingly, the second imaging light LB is also imaging light in the second wavelength region, that is, blue imaging light.

The second electro-optical device 10B has a second pixel area 12B including the plurality of second pixels 11B arranged in a matrix, and a second non-pixel area 13B surrounding the second pixel area 12B. The second electro-optical device 10B is bonded to a blue light incident surface 21 via a second adhesive layer 40B, which is transmissive, in a state of facing the blue light incident surface 21 of the dichroic prism 20. In other words, the second electro-optical device 10B is arranged such that the second imaging light LB is perpendicularly incident to the blue light incident surface 21.

The third electro-optical device 10G has a plurality of third pixels 11G. The plurality of third pixels 11G are arranged in a matrix on a substrate of the third electro-optical device 10G. The third pixel 11G emits light in a third wavelength region shorter than the first wavelength region, and longer than the second wavelength region. In the present exemplary embodiment, the light in the third wavelength region is green light. That is, the third wavelength region includes, for example, wavelengths from 495 nm to 570 nm. In the following description, the light in the third wavelength region may be referred to as "green light". The third imaging light LG emitted from the third electro-optical device 10G includes green light emitted from each of the plurality of third pixels 11G. Accordingly, the third imaging light LG is also imaging light in the third wavelength region, that is, green imaging light.

The third electro-optical device 10G has a third pixel area 12G including the plurality of third pixels 11G arranged in a matrix, and a third non-pixel area 13G surrounding the third pixel area 12G. The third electro-optical device 10G is bonded to a green light incident surface 22 via a third adhesive layer 40G, which is transmissive, in a state of facing the green light incident surface 22 of the dichroic prism 20. In other words, the third electro-optical device 10G is arranged such that the third imaging light LG is perpendicularly incident to the green light incident surface 22.

Each of the first imaging light LR, the second imaging light LB, and the third imaging light LG does not have polarization characteristics. In other words, each of the first imaging light LR, the second imaging light LB, and the third imaging light LG is unpolarized light that does not have a specific vibration direction. Note that unpolarized light, namely, light that does not have a polarization characteristic is light that is not in a completely unpolarized state and includes a polarization component to some extent. For example, the light has a degree of polarization to the extent that does not actively affect an optical component such as a dichroic mirror, for example, in terms of optical performance, for example, a degree of polarization of less than or equal to 20%.

The dichroic prism 20 is constituted of a light transmissive member having a quadrangular columnar shape. In addition, the quadrangular columnar light transmissive member is constituted by four triangular columnar light transmissive members combined. The dichroic prism 20 has the blue light incident surface 21, the red light incident surface 23 facing the blue light incident surface 21, the green light incident surface 22 perpendicularly in contact with the blue light incident surface 21 and the red light incident surface 23, and a synthetic light emitting surface 24 facing the green light incident surface 22.

The dichroic prism 20 has a first dichroic mirror 25 that does not have polarization separation characteristics, and a second dichroic mirror 26 that does not have polarization separation characteristics. The first dichroic mirror 25 and the second dichroic mirror 26 intersect at an angle of 90° with each other. The first dichroic mirror 25 reflects the second imaging light LB incident via the blue light incident surface 21 toward the synthesis light emitting surface 24, and transmits the third imaging light LG incident via the green light incident surface 22 toward the synthetic light emitting surface 24. The second dichroic mirror 26 reflects the first imaging light LR incident via the red light incident surface 23 toward the synthesis light emitting surface 24, and transmits the third imaging light LG incident via the green light incident surface 22 toward the synthetic light emitting surface 24. Due to the characteristics of the first dichroic mirror 25 and the second dichroic mirror 26, a synthetic imaging light LW obtained by synthesizing the first imaging light LR, the second imaging light LB, and the third imaging light LG is emitted from the synthetic light emitting surface 24.

Figure 2:
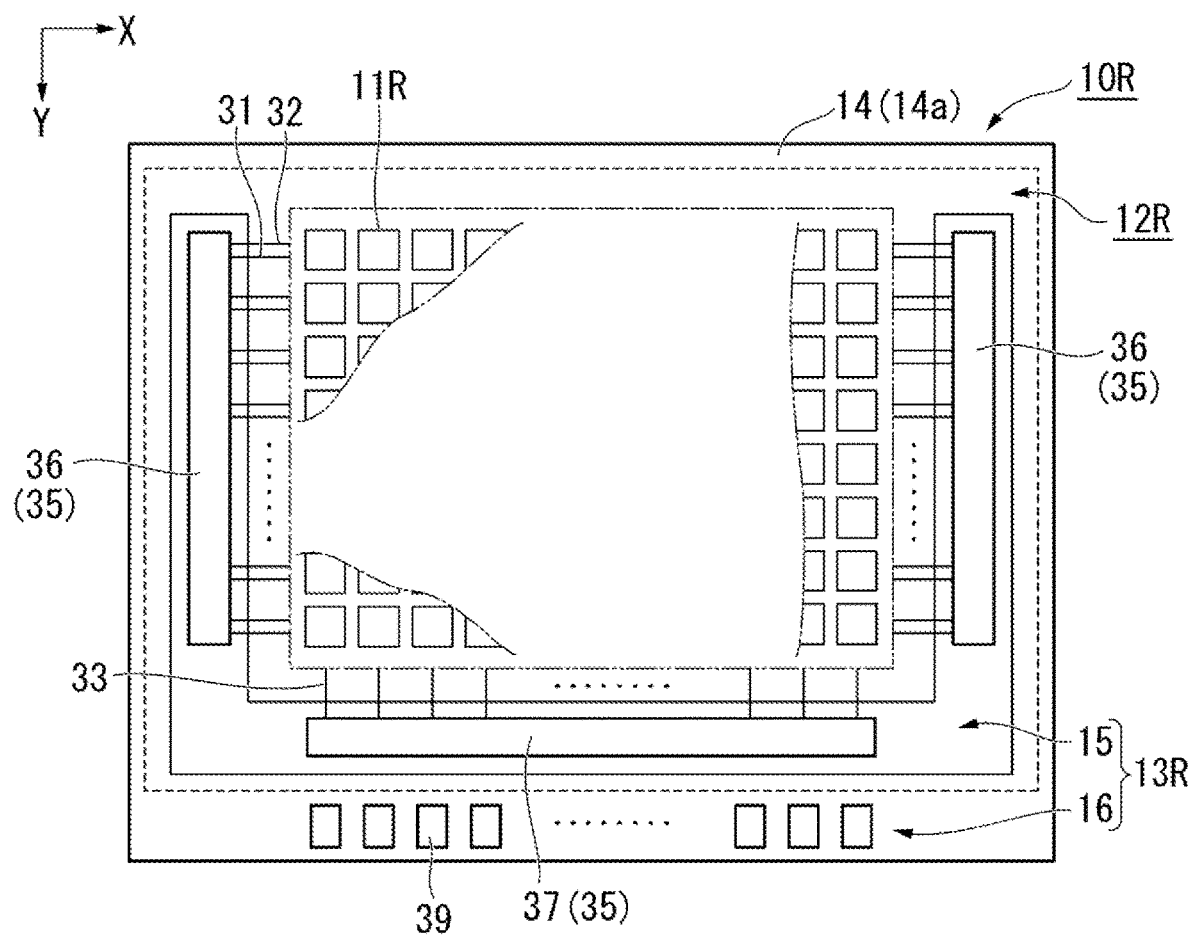
FIG. 2 is a schematic configuration diagram illustrating an overall configuration of a first electro-optical device included in the optical module according to the present exemplary embodiment.

FIG. 2 is a schematic configuration diagram illustrating an overall configuration of the first electro-optical device 10R.

Since a basic configuration of each of the first electro-optical device 10R, the second electro-optical device 10B, and the third electro-optical device 10G is common, the overall configuration of the first electro-optical device 10R will be representatively described below. In FIG. 2, a horizontal direction of the first electro-optical device 10R is referred to as an X direction, and a vertical direction of the first electro-optical device 10R is referred to as a Y direction.

Figure 3:
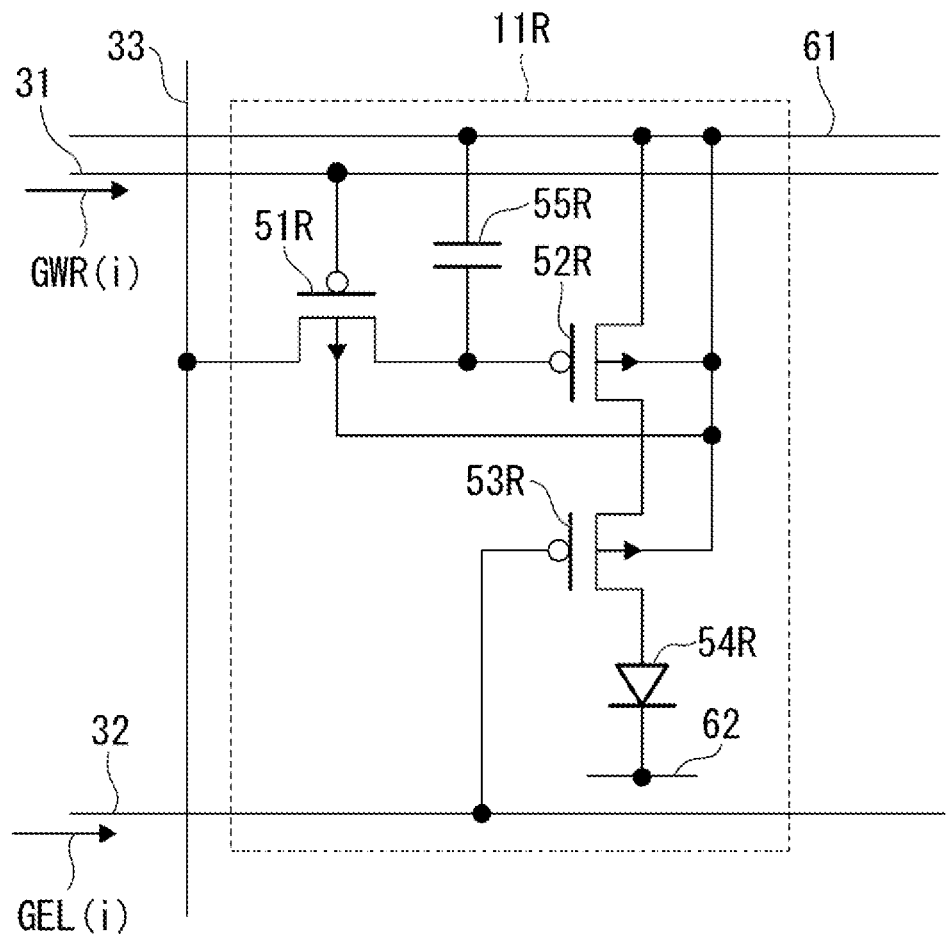
FIG. 3 is an equivalent circuit diagram illustrating a configuration of a pixel circuit included in a first pixel provided in the first electro-optical device.

As illustrated in FIG. 2, the first pixel area 12R and the first non-pixel area 13R are provided at a first surface 14a of a substrate 14 of the first electro-optical device 10R. Further, the first non-pixel area 13R includes a peripheral area 15 and a mounting area 16. The first pixel area 12R is a rectangular region in which the plurality of first pixels 11R are arranged in a matrix. A plurality of scanning lines 31 extending in the X direction, a plurality of control lines 32 extending in the X direction each corresponding to the scanning line 31, and a plurality of data lines 33 extending in the Y direction intersecting the X direction, are provided in the first pixel area 12R. The first pixel 11R is a region corresponding to each of intersections of the plurality of scanning lines 31 and the plurality of data lines 33. Accordingly, the plurality of first pixels 11R are arrayed in a matrix in the X direction and the Y direction. The first pixel 11R has a pixel circuit as illustrated in FIG. 3. A configuration of the pixel circuit included in the first pixel 11R will be described later.

The peripheral area 15 is a rectangular frame-shaped region that surrounds the first pixel area 12R. Three driving circuits 35 are provided in the peripheral area 15. The three driving circuits 35 are circuits that drive each first pixel 11R in the first pixel area 12R. The driving circuits 35 include two scanning line drive circuits 36 and a data line driving circuit 37. The first electro-optical device 10R is an electro-optical device with built-in circuits in which the driving circuit 35 is formed at the first surface 14a of the substrate 14 and that is configured with an active element such as a transistor.

The mounting area 16 is provided on an opposite side to the first pixel area 12R with the peripheral area 15 interposed therebetween, that is, on an outside of the peripheral area 15. A plurality of mounting terminals 39 are provided in the mounting area 16. A control signal and power supply potential are supplied to the mounting terminal 39 from various external circuits (not illustrated) including a control circuit and a power supply circuit. The external circuits are mounted to a flexible wiring substrate (not illustrated) coupled to the mounting area 16, for example.

FIG. 3 is an equivalent circuit diagram illustrating a configuration of the pixel circuit included in the first pixel 11R.

Since the configuration of the pixel circuit included in each of the plurality of first pixels 11R is common, description will be given using the pixel circuit included in the first pixel 11R located at an i-th row and a j-th column an example. Note that, "i" is a symbol generally indicating a number of a row in which the first pixel 11R is arranged, and is an integer from 1 to m. "j" is a symbol generally indicating a number of a column in which the first pixel 11R is arranged, and is an integer from 1 to n.

As illustrated in FIG. 3, the pixel circuit of the first pixel 11R has a first selection transistor 51R, a first drive transistor 52R, a first light-emitting control transistor 53R, a first light-emitting element 54R, and a first retention capacitor 55R. In the present exemplary embodiment, the first selection transistor 51R, the first drive transistor 52R, and the first light-emitting control transistor 53R are each a p-channel MOS-FET.

A gate electrode of the first selection transistor 51R is electrically coupled to the scanning line 31 in the i-th row. Another of source/drain regions of the first selection transistor 51R is electrically coupled to the data line 33 in the j-th column. One of the source/drain regions of the first selection transistor 51R is electrically coupled to a gate electrode of the first drive transistor 52R and one electrode of the first retention capacitor 55R. A back gate of the first selection transistor 51R is electrically coupled to a power source wiring line 61 to which power supply potential is applied.

The gate electrode of the first drive transistor 52R is electrically coupled to the one of the source/drain regions of the first selection transistor 51R, and to the one electrode of the first retention capacitor 55R. One of source/drain regions of the first drive transistor 52R is electrically coupled to the power source wiring line 61. Another of the source/drain regions of the first drive transistor 52R is electrically coupled to one of source/drain regions of the first light-emitting control transistor 53R. A back gate of the first drive transistor 52R is electrically coupled to the power source wiring line 61.

A gate electrode of the first light-emitting control transistor 53R is electrically coupled to the control line 32 in the i-th row. The one of the source/drain regions of the first light-emitting control transistor 53R is electrically coupled to the other of the source/drain regions of the first drive transistor 52R. Another of the source/drain regions of the first light-emitting control transistor 53R is electrically coupled to an anode of the first light-emitting element 54R. A back gate of the first light-emitting control transistor 53R is electrically coupled to the power source wiring line 61.

The first light-emitting element 54R is a light-emitting element that emits light in the first wavelength region, that is, red light. The first light-emitting element 54R has a configuration in which a light-emitting layer is sandwiched between the anode and a cathode, and is, for example, an organic EL diode. The anode of the first light-emitting element 54R is electrically coupled to the other of the source/drain regions of the first light-emitting control transistor 53R. The cathode of the first light-emitting element 54R is electrically coupled to a common wiring line 62 to which common potential is applied.

The first retention capacitor 55R is a capacitor for retaining gate potential of the first drive transistor 52R. The one electrode of the first retention capacitor 55R is electrically coupled to the one of the source/drain regions of the first selection transistor 51R, and to the gate electrode of the first drive transistor 52R. Another electrode of the first retention capacitor 55R is electrically coupled to the power source wiring line 61. Note that, as the first retention capacitor 55R, a capacitor parasitic on the gate electrode of the first drive transistor 52R may be used, or a capacitor formed by sandwiching an insulating layer between mutually different conductive layers in a silicon substrate may be used.

In the pixel circuit configured as described above, when a scanning signal GWR(i) supplied to the scanning line 31 in the i-th row is at a high level, the first selection transistor 51R is in an OFF-state. On the other hand, when the scanning signal GWR(i) is at a low level, the first selection transistor 51R is in an ON-state. When the first selection transistor 51R is in the ON-state, a charging current flows to the first retention capacitor 55R in accordance with a potential difference Vd between potential of the data line 33 and potential of the power source wiring line 61, and thus the first retention capacitor 55R is charged until a voltage between electrodes of the first retention capacitor 55R becomes the potential difference Vd.

A current flowing between the other of the source/drain regions of the first drive transistor 52R and the one of the source/drain regions depends on the gate potential of the first drive transistor 52R. The gate potential of the first drive transistor 52R is equal to a voltage retained by the first retention capacitor 55R, that is, the voltage between electrodes of the first retention capacitor 55R. Thus, a current having a current value in accordance with the voltage retained by the first retention capacitor 55R flows between the other of the source/drain regions of the first drive transistor 52R and the one of the source/drain regions. Hereinafter, the current flowing between the other of the source/drain regions of the first drive transistor 52R and the one of the source/drain regions is referred to as a "drive current".

When a control signal GEL(i) supplied to the control line 32 in the i-th row is at the high level, the first light-emitting control transistor 53R is in the OFF-state. When the first light-emitting control transistor 53R is in the OFF-state, the anode of the first light-emitting element 54R is in a state of electrically uncoupled from the other of the source/drain regions of the first drive transistor 52R, thus no drive current flows to the first light-emitting element 54R via the first drive transistor 52R. That is, when the first light-emitting control transistor 53R is in the OFF-state, the first light-emitting element 54R does not emit light.

On the other hand, when the control signal GEL(i) is at the low level, the first light-emitting control transistor 53R is in the ON-state. When the first light-emitting control transistor 53R is in the ON-state, the anode of the first light-emitting element 54R is brought into a state of electrically coupled to the other of the source/drain regions of the first drive transistor 52R via the first light-emitting control transistor 53R, thus a drive current having a current value in accordance with the voltage retained by the first retention capacitor 55R flows to the first light-emitting element 54R via the first drive transistor 52R. That is, when the first light-emitting control transistor 53R is in the ON-state, the first light-emitting element 54R emits light in accordance with the drive current. Intensity of red light emitted from the first light-emitting element 54R varies depending on a value of the drive current, that is, the voltage retained by the first retention capacitor 55R.

As described above, the first pixel 11R includes the first light-emitting element 54R that emits light in the first wavelength region (red light), and the first light-emitting control transistor 53R corresponding to the first light-emitting element 54R. That is, the first electro-optical device 10R has the first light-emitting element 54R that emits light in the first wavelength region (red light), and the first light-emitting control transistor 53R corresponding to the first light-emitting element 54R.

Although not illustrated, similar to the first pixel 11R, a pixel circuit of the second pixel 11B arranged in the second electro-optical device 10B has a second selection transistor 51B, a second drive transistor 52B, a second light-emitting control transistor 53B, a second light-emitting element 54B, and a second retention capacitor 55B. The second light-emitting element 54B is a light-emitting element that emits light in the second wavelength region, that is, blue light. The second light-emitting element 54B has a configuration in which a light-emitting layer is sandwiched between an anode and a cathode, and is, for example, an organic EL diode.

In the pixel circuit of the second pixel 11B as well, when the second selection transistor 51B is in the ON-state, the second retention capacitor 55B is charged until a voltage between electrodes of the second retention capacitor 55B becomes the potential difference Vd. Then, when the second light-emitting control transistor 53B is in the ON-state, a drive current having a current value corresponding to a voltage retained by the second retention capacitor 55B flows to the second light-emitting element 54B via the second drive transistor 52B. That is, when the second light-emitting control transistor 53B is in the ON-state, the second light-emitting element 54B emits light in accordance with the drive current. Intensity of blue light emitted from the second light-emitting element 54B varies depending on a value of the drive current, that is, the voltage retained by the second retention capacitor 55B.

As described above, the second pixel 11B includes the second light-emitting element 54B that emits light in the second wavelength region (blue light), and the second light-emitting control transistor 53B corresponding to the second light-emitting element 54B. That is, the second electro-optical device 10B has the second light-emitting element 54B that emits light in the second wavelength region (blue light), and the second light-emitting control transistor 53B corresponding to the second light-emitting element 54B.

Additionally, although not illustrated, similar to the first pixel 11R and the second pixel 11B, a pixel circuit of the third pixel 11G arranged in the third electro-optical device 10G has a third selection transistor 51G, a third drive transistor 52G, a third light-emitting control transistor 53G, a third light-emitting element 54G, and a third retention capacitor 55G. The third light-emitting element 54G is a light-emitting element that emits light in the third wavelength region, that is, green light. The third light-emitting element 54G has a configuration in which a light-emitting layer is sandwiched between an anode and a cathode, and is, for example, an organic EL diode.

In the pixel circuit of the third pixel 11G as well, when the third selection transistor 51G is in the ON-state, the third retention capacitor 55G is charged until a voltage between electrodes of the third retention capacitor 55G becomes the potential difference Vd. Then, when the third light-emitting control transistor 53G is in the ON-state, a drive current having a current value corresponding to a voltage retained by the third retention capacitor 55G flows to the third light-emitting element 54G via the third drive transistor 52G. That is, when the third light-emitting control transistor 53G is in the ON-state, the third light-emitting element 54G emits light in accordance with the drive current. Intensity of green light emitted from the third light-emitting element 54G varies depending on a value of the drive current, that is, the voltage retained by the third retention capacitor 55G.

As described above, the third pixel 11G includes the third light-emitting element 54G that emits light in the third wavelength region (green light), and the third light-emitting control transistor 53G corresponding to the third light-emitting element 54G. That is, the third electro-optical device 10G has the third light-emitting element 54G that emits light in the third wavelength region (green light), and the third light-emitting control transistor 53G corresponding to the third light-emitting element 54G.

In the optical module 1 of the present exemplary embodiment, an area of the first light-emitting element 54R included in the first pixel 11R, an area of the second light-emitting element 54B included in the second pixel 11B, and an area of the third light-emitting element 54G included in the third pixel 11G are the same. Note that, the area of each light-emitting element 54 can also be said to be an area of a region where the anode, the light-emitting layer, and the cathode overlap in plan view, or an area of a region where the anode and the light-emitting layer contact.

Figure 4:
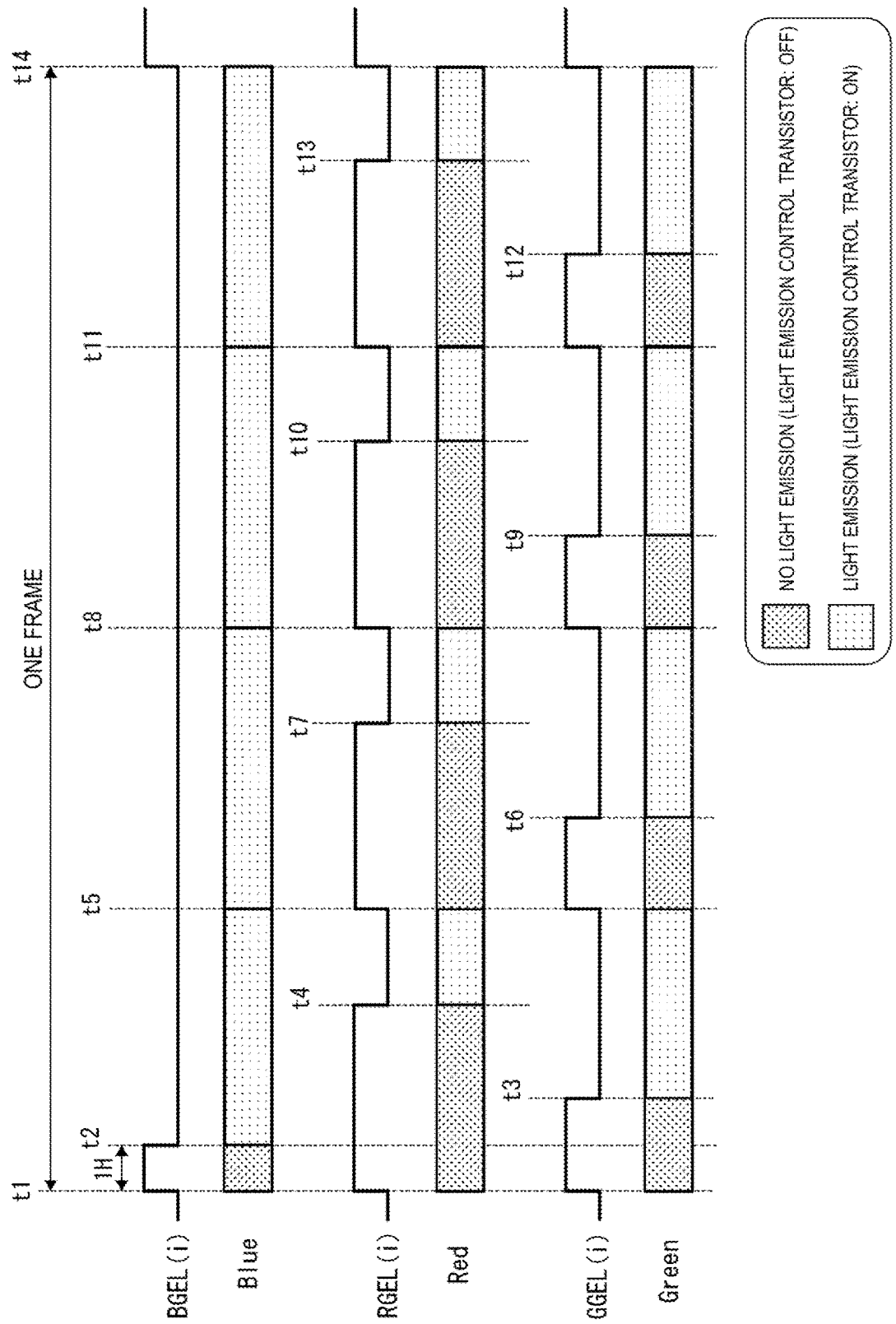
FIG. 4 is a timing chart illustrating a temporal correspondence relationship among a light emissiON-state of a first light-emitting element in one frame, a light emissiON-state of a second light-emitting element in the one frame, and a light emissiON-state of a third light-emitting element in the one frame.

FIG. 4 is a timing chart illustrating a temporal correspondence relationship among a light emissiON-state of the first light-emitting element 54R in one frame, a light emissiON-state of the second light-emitting element 54B in the one frame, and a light emissiON-state of the third light-emitting element 54G in the one frame. In FIG. 4, a period from a time t1 to a time t14 is the one frame. For example, when each of the first electro-optical device 10R, the second electro-optical device 10B, and the third electro-optical device 10G has the 1080 scanning lines 31, a length of the one frame is represented by Equation (1) below. In Equation (1) below, "1H" is a period corresponding to one horizontal scanning period, that is a period corresponding to one cycle of a horizontal synchronization signal.

$$\text{One frame} = \text{a blanking period} + 1080 \times 1H \tag{1}$$

In FIG. 4, a period from the time t1 to a time t2 is the blanking period. The blanking period is equal to one horizontal scanning period (1H). In this blanking period, the first selection transistor 51R is controlled to be in the ON-state, thus the first retention capacitor 55R is charged until the voltage between electrodes of the first retention capacitor 55R reaches a target voltage. The target voltage is set such that, a drive current with which intensity of red light emitted from the first light-emitting element 54R reaches a desired value is generated by the first drive transistor 52R in one frame. The target voltage can be set in accordance with the potential difference Vd between the potential of the data line 33 and the potential of the power source wiring line 61.

Similarly, in the blanking period, the second selection transistor 51B is controlled to be in the ON-state, thus the second retention capacitor 55B is charged until the voltage between electrodes of the second retention capacitor 55B reaches a target voltage. The target voltage is set such that, a drive current with which intensity of blue light emitted from the second light-emitting element 54B reaches a desired value is generated by the second drive transistor 52B in one frame.

Similarly, in the blanking period, the third selection transistor 51G is controlled to be in the ON-state, thus the third retention capacitor 55G is charged until the voltage between electrodes of the third retention capacitor 55G reaches a target voltage. The target voltage is set such that, a drive current with which intensity of green light emitted from the third light-emitting element 54G reaches a desired value is generated by the third drive transistor 52G in one frame.

In FIG. 4, RGEL(i) is a control signal supplied to the control line 32 in the i-th row in the first electro-optical device 10R. In FIG. 4, BGEL(i) is a control signal supplied to the control line 32 in the i-th row in the second electro-optical device 10B. In FIG. 4, GGEL(i) is a control signal supplied to the control line 32 in the i-th row in the third electro-optical device 10G. Hereinafter, RGEL(i) is referred to as a first control signal, BGEL(i) is referred to as a second control signal, and GGEL(i) is referred to as a third control signal.

As illustrated in FIG. 4, in the blanking period, the first control signal RGEL(i), the second control signal BGEL(i), and the third control signal GGEL(i) are each set to the high level. As a result, the first light-emitting control transistor 53R, the second light-emitting control transistor 53B, and the third light-emitting control transistor 53G are each controlled to be in the OFF-state, thus, no drive current flows to each of the first light-emitting element 54R, the second light-emitting element 54B, and the third light-emitting element 54G in the blanking period. Therefore, in the blanking period, the first light-emitting element 54R, the second light-emitting element 54B, and the third light-emitting element 54G each do not emit light.

As illustrated in FIG. 4, the second control signal BGEL(i) is set to the low level in a period from the time t2 at which the blanking period ends to the time t14 at which the one frame ends. As a result, in the period from the time t2 to the time t14, the second light-emitting control transistor 53B is controlled to be in the ON-state, and thus, a drive current having a current value corresponding to the voltage retained by the second retention capacitor 55B flows to the second light-emitting element 54B. Thus, in the period from the time t2 to the time t14, the second light-emitting element 54B emits blue light having intensity corresponding to the drive current.

As illustrated in FIG. 4, in a period from the time t2 at which the blanking period ends to the time t4, the first control signal RGEL(i) is set to the high level. As a result, in the period from the time t2 to the time t4, the first light-emitting control transistor 53R is controlled to be in the OFF-state, thus no drive current flows to the first light-emitting element 54R. Therefore, in the period from the time t2 to the time t4, the first light-emitting element 54R does not emit light.

As illustrated in FIG. 4, in a period from the time t4 to a time t5, the first control signal RGEL(i) is set to the low level. As a result, in the period from the time t4 to the time t5, the first light-emitting control transistor 53R is controlled to be in the ON-state, and thus, a drive current having a current value corresponding to a voltage retained by the first retention capacitor 55R flows to the first light-emitting element 54R. Thus, in the period from the time t4 to the time t5, the first light-emitting element 54R emits red light having intensity corresponding to the drive current.

As illustrated in FIG. 4, in a period from the time t5 to a time t7, the first control signal RGEL(i) is set to the high level. As a result, in the period from the time t5 to the time t7, the first light-emitting control transistor 53R is controlled to be in the OFF-state, thus no drive current flows to the first light-emitting element 54R. Therefore, in the period from the time t5 to the time t7, the first light-emitting element 54R does not emit light.

As illustrated in FIG. 4, in a period from the time t7 to a time t8, the first control signal RGEL(i) is set to the low level. As a result, in the period from the time t7 to the time t8, the first light-emitting control transistor 53R is controlled to be in the ON-state, and thus, a drive current having a current value corresponding to the voltage retained by the first retention capacitor 55R flows to the first light-emitting element 54R. Thus, in the period from the time t7 to the time t8, the first light-emitting element 54R emits red light having intensity corresponding to the drive current.

As illustrated in FIG. 4, in a period from the time t8 to a time t10, the first control signal RGEL(i) is set to the high level. As a result, in the period from the time t8 to the time t10, the first light-emitting control transistor 53R is controlled to be in the OFF-state, thus no drive current flows to the first light-emitting element 54R. Therefore, in the period from the time t8 to the time t10, the first light-emitting element 54R does not emit light.

As illustrated in FIG. 4, in a period from the time t10 to a time t11, the first control signal RGEL(i) is set to the low level. As a result, in the period from the time t10 to the time t11, the first light-emitting control transistor 53R is controlled to be in the ON-state, and thus, a drive current having a current value corresponding to the voltage retained by the first retention capacitor 55R flows to the first light-emitting element 54R. Thus, in the period from the time t10 to the time t11, the first light-emitting element 54R emits red light having intensity corresponding to the drive current.

As illustrated in FIG. 4, in a period from the time t11 to a time t13, the first control signal RGEL(i) is set to the high level. As a result, in the period from the time t11 to the time t13, the first light-emitting control transistor 53R is controlled to be in the OFF-state, thus no drive current flows to the first light-emitting element 54R. Therefore, in the period from the time t11 to the time t13, the first light-emitting element 54R does not emit light.

As illustrated in FIG. 4, in a period from the time t13 to a time t14 at which the one frame ends, the first control signal RGEL(i) is set to the low level. As a result, in the period from the time t13 to the time t14, the first light-emitting control transistor 53R is controlled to be in the ON-state, and thus, a drive current having a current value corresponding to the voltage retained by the first retention capacitor 55R flows to the first light-emitting element 54R. Thus, in the period from the time t13 to the time t14, the first light-emitting element 54R emits red light having intensity corresponding to the drive current.

As illustrated in FIG. 4, in a period from the time t2 at which the blanking period ends to a time t3 (t3<t4), the third control signal GGEL(i) is set to the high level. As a result, in the period from the time t2 to the time t3, the third light-emitting control transistor 53G is controlled to be in the OFF-state, thus no drive current flows to the third light-emitting element 54G. Therefore, in the period from the time t2 to the time t3, the third light-emitting element 54G does not emit light.

As illustrated in FIG. 4, in a period from the time t3 to the time t5, the third control signal GGEL(i) is set to the low level. As a result, in the period from the time t3 to the time t5, the third light-emitting control transistor 53G is controlled to be in the ON-state, and thus, a drive current having a current value corresponding to a voltage retained by the third retention capacitor 55G flows to the third light-emitting element 54G. Thus, in the period from the time t3 to the time t5, the third light-emitting element 54G emits green light having intensity corresponding to the drive current.

As illustrated in FIG. 4, in a period from the time t5 to a time t6 (t6<t7), the third control signal GGEL(i) is set to the high level. As a result, in the period from the time t5 to the time t6, the third light-emitting control transistor 53G is controlled to be in the OFF-state, thus no drive current flows to the third light-emitting element 54G. Therefore, in the period from the time t5 to the time t6, the third light-emitting element 54G does not emit light.

As illustrated in FIG. 4, in a period from the time t6 to the time t8, the third control signal GGEL(i) is set to the low level. As a result, in the period from the time t6 to the time t8, the third light-emitting control transistor 53G is controlled to be in the ON-state, and thus, a drive current having a current value corresponding to the voltage retained by the third retention capacitor 55G flows to the third light-emitting element 54G. Thus, in the period from the time t6 to the time t8, the third light-emitting element 54G emits green light having intensity corresponding to the drive current.

As illustrated in FIG. 4, in a period from the time t8 to a time t9 (t9<t10), the third control signal GGEL(i) is set to the high level. As a result, in the period from the time t8 to the time t9, the third light-emitting control transistor 53G is controlled to be in the OFF-state, thus no drive current flows to the third light-emitting element 54G. Therefore, in the period from the time t8 to the time t9, the third light-emitting element 54G does not emit light.

As illustrated in FIG. 4, in a period from the time t9 to the time t11, the third control signal GGEL(i) is set to the low level. As a result, in the period from the time t9 to the time t11, the third light-emitting control transistor 53G is controlled to be in the ON-state, and thus, a drive current having a current value corresponding to the voltage retained by the third retention capacitor 55G flows to the third light-emitting element 54G. Thus, in the period from the time t9 to the time t11, the third light-emitting element 54G emits green light having intensity corresponding to the drive current.

As illustrated in FIG. 4, in a period from the time t11 to a time t12 (t12<t13), the third control signal GGEL(i) is set to the high level. As a result, in the period from the time t11 to the time t12, the third light-emitting control transistor 53G is controlled to be in the OFF-state, thus no drive current flows to the third light-emitting element 54G. Therefore, in the period from the time t11 to the time t12, the third light-emitting element 54G does not emit light.

As illustrated in FIG. 4, in a period from the time t12 to the time t14 at which the one frame ends, the third control signal GGEL(i) is set to the low level. As a result, in the period from the time t12 to the time t14, the third light-emitting control transistor 53G is controlled to be in the ON-state, and thus, a drive current having a current value corresponding to the voltage retained by the third retention capacitor 55G flows to the third light-emitting element 54G. Thus, in the period from the time t12 to the time t14, the third light-emitting element 54G emits green light having intensity corresponding to the drive current.

As described above, in the optical module 1 of the present exemplary embodiment, the first period in which the first light-emitting control transistor 53R is in the ON-state in the one frame is shorter than the second period in which the second light-emitting control transistor 53B is in the ON-state in the one frame. In other words, the first period in which the first light-emitting element 54R emitting red light in the one frame emits light in accordance with a drive current is shorter than the second period in which the second light-emitting 54B emitting blue light in the one frame emits light in accordance with a drive current. Hereinafter, the first period may be referred to as a "red light emission period" and the second period may be referred to as a "blue light emission period".

In addition, in the optical module 1 of the present exemplary embodiment, a third period in which the third light-emitting control transistor 53G is in the ON-state in the one frame is shorter than the second period and longer than the first period. In other words, the third period in which the third light-emitting element 54G emitting green light in the one frame emits light in accordance with a drive current is shorter than the second period and longer than the first period. Hereinafter, the third period may be referred to as a "green light emission period".

The optical module 1 synthesizes the first imaging light LR, which is red, emitted from the first electro-optical device 10R having the first light-emitting element 54R, the second imaging light LB, which is blue, emitted from the second electro-optical device 10B having the second light-emitting element 54B, and the third imaging light LG, which is green, emitted from the third electro-optical device 10G having the third light-emitting element 54G, to generate the synthetic imaging light LW in which the three colors are mixed.

In this manner, when the synthetic imaging light LW is generated using the plurality of light-emitting elements 54R, 54B, and 54G that emit light in the different wavelength regions, if the respective light-emitting elements 54R, 54B, and 54G are continuously driven for a long period of time in a state where the red light emission period, the blue light emission period, and the green light emission period are the same, there is a possibility that color shifting occurs when a mixed color, particularly the synthetic imaging light LW, which is white, is generated, due to the lifetime characteristics of the light-emitting elements 54R, 54B, and 54G being different from each other.

Figures 5, 6, 7:
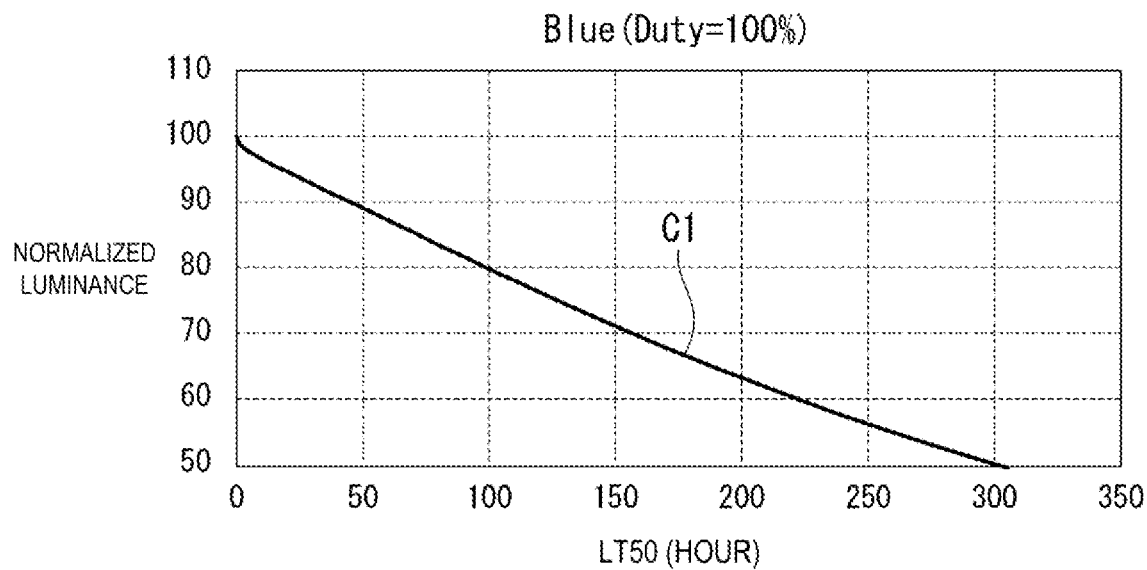
FIG. 5 is a diagram showing respective luminance half-lives (LT50) of a first electro-optical device, a second electro-optical device, and a third electro-optical device, when white synthetic imaging light is generated by driving the first light-emitting element, the second light-emitting element, and the third light-emitting element with a duty ratio of 100%.
FIG. 6 is a diagram showing a correspondence relationship between duty ratios and drive luminance required to achieve constant visual luminance in the third electro-optical device, and luminance half-lives when the third light-emitting element is driven with the respective duty ratios.
FIG. 7 is a graph showing a luminance half-life curve of the second electro-optical device, when the second light-emitting element is driven with a duty ratio of 100%.

FIG. 5 illustrates luminance half-lives (LT50) of the first electro-optical device 10R, the second electro-optical device 10B, and the third electro-optical device 10G, respectively, when the white synthetic imaging light LW is generated by driving the respective light-emitting elements 54R, 54B, and 54B with a duty ratio of 100%. "Driving the light-emitting element with a duty ratio of 100%" means that the light-emitting control transistor is controlled to be in the ON-state in all the periods except for the blanking period in the one frame.

In FIG. 5, "RED" represents the first electro-optical device 10R. As illustrated in FIG. 5, when, in order to generate the white synthetic imaging light LW, the first light-emitting element 54R is driven with the duty ratio of 100% in a state where a drive current value is set such that visual luminance of the red first imaging light LR emitted from the first electro-optical device 10R is 1372 (cd/m$^2$), the luminance half-life of the first electro-optical device 10R is 600 hours.

In FIG. 5, "BLUE" represents the second electro-optical device 10B. As illustrated in FIG. 5, when, in order to generate the white synthetic imaging light LW, the second light-emitting element 54B is driven with the duty ratio of 100% in a state where a drive current value is set such that visual luminance of the blue second imaging light LB emitted from the second electro-optical device 10B is 356 (cd/m$^2$), the luminance half-life of the second electro-optical device 10B is 300 hours.

In FIG. 5, "GREEN" represents the third electro-optical device 10G. As illustrated in FIG. 5, when, in order to generate the white synthetic imaging light LW, the third light-emitting element 54G is driven with the duty ratio of 100% in a state where a drive current value is set such that visual luminance of the green third imaging light LG emitted from the third electro-optical device 10G is 3272 (cd/m$^2$), the luminance half-life of the third electro-optical device 10G is 400 hours.

A luminance half-life is a time taken for luminance of imaging light to decrease from maximum luminance to half the maximum luminance when driving is performed at constant current density. As illustrated in FIG. 5, the luminance half-life of the first electro-optical device 10R having the first light-emitting element 54R emitting red light is longer than the luminance half-life of the second electro-optical device 10B having the second light-emitting element 54B emitting blue light. In other words, a deterioration rate of the second light-emitting element 54B emitting blue light is greater than a deterioration rate of the first light-emitting element 54R emitting red light. Therefore, when the white synthetic imaging light LW is generated by driving each of the light-emitting elements 54R, 54B, and 54G with the duty ratio of 100%, and the synthetic imaging light LW after a predetermined period of time has elapsed is observed, due to the deterioration rates of the respective light-emitting elements 54R, 54B, and 54G being different, variations in the visual luminance of the respective colors required for white display are generated, and the variations becomes color shifting and is visually recognized.

FIG. 6 shows a correspondence relationship between duty ratios and drive luminance required to achieve constant visual luminance in the third electro-optical device 10G, and luminance half-lives (LT50) when the third light-emitting element 54G is driven with the respective duty ratios. In FIG. 6, for example, when the duty ratio is 50%, the light-emitting control transistor is controlled to be in the ON-state in a period, which is 50% of a total period other than the blanking period in one frame. In addition, since the drive luminance is a physical amount that depends on a drive current, the drive luminance may be rephrased as a drive current hereinafter.

As illustrated in FIG. 6, when the drive duty ratio of the third light-emitting element 54G is decreased, and the drive current of the third light-emitting element 54G is increased in accordance with the duty ratio so as to obtain constant visual luminance, the luminance half-life is shortened. In other words, when the green light emission period is shortened while the condition under which constant visual luminance is obtained is met, the deterioration rate of the third light-emitting element 54G is increased. This means that the deterioration rate of the third light-emitting element 54G can be controlled by the green light emission period. Similarly, for the first light-emitting element 54R and the second light-emitting element 54B, the respective deterioration rate can be controlled by lengths of the respective light emission periods.

The inventors of the present application, based on the above knowledge, thought that, when the luminance half-life of the first electro-optical device 10R can be brought close to the shortest luminance half-life of the second electro-optical device 10B by reducing the drive duty ratio of the first electro-optical device 10R having the longest luminance half-life, and shortening the luminance half-life of the first electro-optical device 10R, color shifting generated in the white synthetic imaging light LW could be suppressed. Then, the inventors of the present application have diligently researched on the relationship between the drive duty ratio of the first electro-optical device 10R and the drive duty ratio of the second electro-optical device 10B with which the color shifting can be suppressed, that is, the relationship between the red light emission period and the blue light emission period with which the color shifting can be suppressed.

The results of research are shown in FIG. 7 to FIG. 11.

Figure 8:
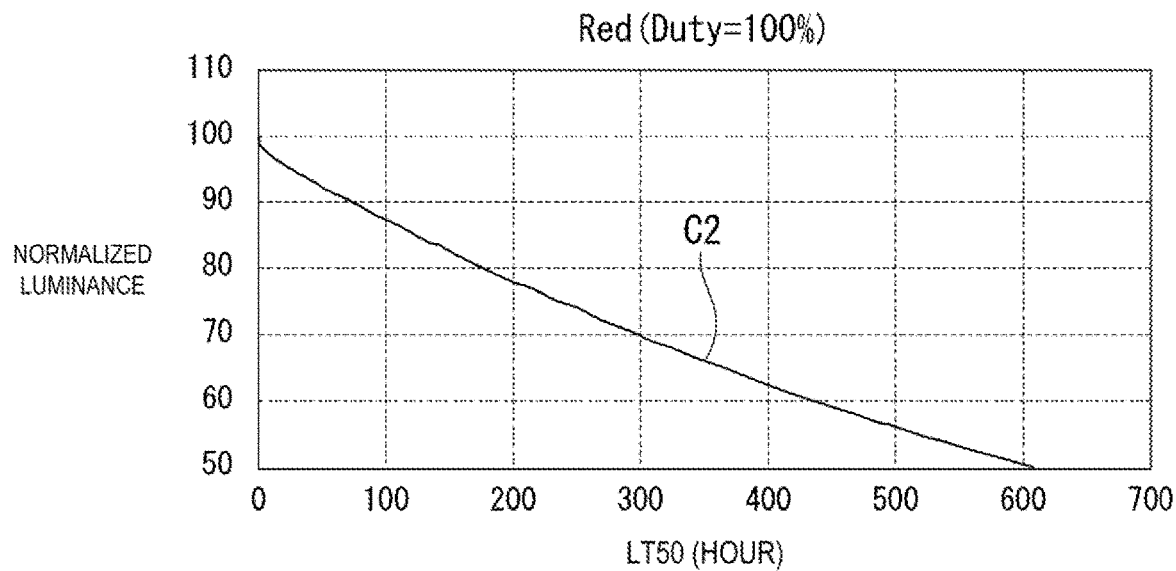
FIG. 8 is a graph showing a luminance half-life curve of the first electro-optical device, when the first light-emitting element is driven with a duty ratio of 100%.
Figure 9:
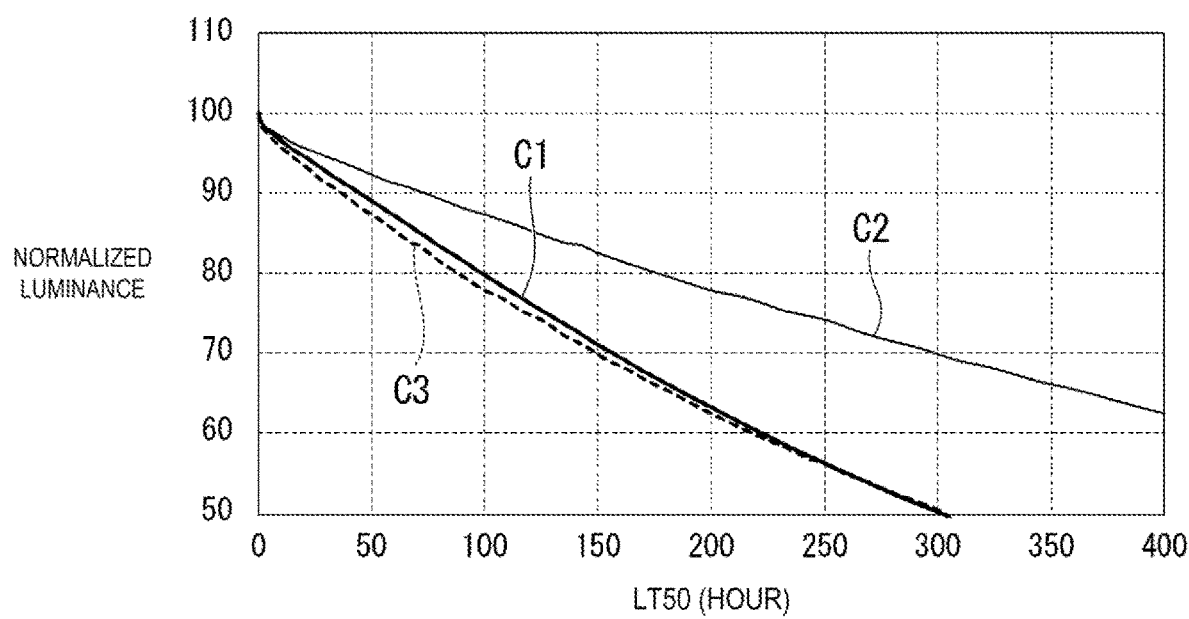
FIG. 9 is a graph showing the luminance half-life curve of the second electro-optical device shown in FIG. 7, the luminance half-life curve of the first electro-optical device shown in FIG. 8, and a luminance half-life curve of the first electro-optical device when the first light-emitting element is driven with a duty ratio of 42%.

FIG. 7 is a graph showing a luminance half-life curve C1 of the second electro-optical device 10B, when the second light-emitting element 54B is driven with a duty ratio of 100%. FIG. 8 is a graph showing a luminance half-life curve C2 of the first electro-optical device 10R, when the first light-emitting element 54R is driven with a duty ratio of 100%. FIG. 9 is a graph showing the luminance half-life curve C1 of the second electro-optical device 10B, the luminance half-life curve C2 of the first electro-optical device 10R, and a luminance half-life curve C3 of the first electro-optical device 10R when the first light-emitting element 54R is driven with the duty ratio of 42%. As shown in FIG. 9, it was found that by driving the second light-emitting element 54B with the duty ratio of 100%, and driving the first light-emitting element 54R with the duty ratio of 42%, the luminance half-life of the first electro-optical device 10R can be brought close to the luminance half-life of the second electro-optical device 10B.

FIG. 10 shows a relationship between the drive duty ratio of the first light-emitting element 54R and the luminance half-life of the first electro-optical device 10R. The results shown in FIG. 10 demonstrated that the drive duty ratio of the first light-emitting element 54R, that is, the red light emission period, can control the luminance half-life of the first electro-optical device 10R.

FIG. 11 shows a result of researching a relationship among Δu'v', which is an evaluation index of color shifting, a drive duty ratio of the first light-emitting element 54R, a drive duty ratio of the second light-emitting element 54B, and a drive duty ratio of the third light-emitting element 54G, for each of three examples and three comparative examples. Generally, when Δu'v' is less than 0.02, a human cannot recognize the color shifting. Thus, it can be said that when each of the light-emitting elements 54R, 54B, and 54G are continuously driven with a predetermined duty ratio such that the white synthetic imaging light LW is generated, the second electro-optical device 10B having the greatest deterioration rate reaches the luminance half-life, and Δu'v' of the synthetic imaging light LW is less than 0.02, then the color shifting generated in the white synthetic imaging light LW can be suppressed.

In Example 1 shown in FIG. 11, by driving the first light-emitting element 54R with a duty ratio of 42%, driving the second light-emitting element 54B with a duty ratio of 100%, and driving the third light-emitting element 54G with a duty ratio of 70%, the white synthetic imaging light LW was generated. In this Example 1, when the second electro-optical device 10B having the greatest deterioration rate reaches the luminance half-life, the Δu'v' of the synthetic imaging light LW was less than 0.001.

In Example 2 shown in FIG. 11, by driving the first light-emitting element 54R with a duty ratio of 30%, driving the second light-emitting element 54B with a duty ratio of 100%, and driving the third light-emitting element 54G with a duty ratio of 70%, the white synthetic imaging light LW was generated. In this Example 2, when the second electro-optical device 10B having the greatest deterioration rate reaches the luminance half-life, the Δu'v' of the synthetic imaging light LW was 0.018.

In Example 3 shown in FIG. 11, by driving the first light-emitting element 54R with a duty ratio of 60%, driving the second light-emitting element 54B with a duty ratio of 100%, and driving the third light-emitting element 54G with a duty ratio of 70%, the white synthetic imaging light LW was generated. In this Example 3, when the second electro-optical device 10B having the greatest deterioration rate reaches the luminance half-life, the Δu'v' of the synthetic imaging light LW was 0.019.

In Comparative Example 1 shown in FIG. 11, by driving each of the first light-emitting element 54R, the second light-emitting element 54B, and the third light-emitting element 54G with a duty ratio of 100%, the white synthetic imaging light LW was generated. In this Comparative Example 1, when the second electro-optical device 10B having the greatest deterioration rate reaches the luminance half-life, the Δu'v' of the synthetic imaging light LW was 0.026.

In Comparative Example 2 shown in FIG. 11, by driving the first light-emitting element 54R with a duty ratio of 29%, driving the second light-emitting element 54B with a duty ratio of 100%, and driving the third light-emitting element 54G with a duty ratio of 70%, the white synthetic imaging light LW was generated. In this Comparative Example 2, when the second electro-optical device 10B having the greatest deterioration rate reaches the luminance half-life, the Δu'v' of the synthetic imaging light LW was 0.021.

In Comparative Example 3 shown in FIG. 11, by driving the first light-emitting element 54R with a duty ratio of 61%, driving the second light-emitting element 54B with a duty ratio of 100%, and driving the third light-emitting element 54G with a duty ratio of 70%, the white synthetic imaging light LW was generated. In this Comparative Example 3, when the second electro-optical device 10B having the greatest deterioration rate reaches the luminance half-life, the Δu'v' of the synthetic imaging light LW was 0.021.

As shown in FIG. 11, by setting the drive duty ratio of the first light-emitting element 54R from 30% of the drive duty ratio of the second light-emitting element 54B to 60%, a result was obtained that color shifting generated in the white synthetic imaging light LW could be effectively suppressed. In other words, by setting the red light emission period (first period) in one frame to be from 0.3 times to 0.6 times the blue light emission period (second period) in the one frame, the result was obtained that color shifting generated in the white synthetic imaging light LW could be effectively suppressed.

In particular, by setting the drive duty ratio of the first light-emitting element 54R to 42% of the drive duty ratio of the second light-emitting element 54B, a result was obtained that color shifting generated in the white synthetic imaging light LW could be suppressed most. It is conceivable that the reason for this is that, as shown in FIG. 9, by setting the drive duty ratio of the first light-emitting element 54R emitting red light to 42% of the drive duty ratio of the second light-emitting element 54B emitting blue light, the luminance half-life of the first electro-optical device 10R can be brought closest to the luminance half-life of the second electro-optical device 10B.

On the other hand, as shown in FIG. 11, by setting the drive duty ratio of the first light-emitting element 54R to equal to or less than 29% or equal to or greater than 61% of the drive duty ratio of the second light-emitting element 54B, a result was obtained that color shifting of a degree that could be recognized by a human was generated in the white synthetic imaging light LW. In particular, by setting the drive duty ratio of the first light-emitting element 54R to be the same as the drive duty ratio of the second light-emitting element 54B (100%), a result was obtained that large color shifting was generated in the white synthetic imaging light LW.

Based on the above research results, in the optical module 1 of the present exemplary embodiment, the first period in which the first light-emitting control transistor 53R is in the ON-state in one frame is set to be shorter than the second period in which the second light-emitting control transistor 53B is in the ON-state in the one frame. In other words, in the optical module 1 of the present exemplary embodiment, the red light emission period in one frame is shorter than the blue light emission period in the one frame.

According to the present exemplary embodiment as described above, the luminance half-life of the first electro-optical device 10R having the first light-emitting element 54R having the smallest deterioration rate can be brought close to the luminance half-life of the second electro-optical device 10B having the second light-emitting element 54B having the greatest deterioration rate, thus color shifting can be prevented from being generated in the white synthetic imaging light LW caused by the deterioration rate (lifetime characteristics) of each light-emitting element.

In particular, in the optical module 1 of the present exemplary embodiment, the first period in which the first light-emitting control transistor 53R is in the ON-state in the one frame may be from 0.3 times to 0.6 times the second period in which the second light-emitting control transistor 53B is in the ON-state in the one frame. In other words, in the optical module 1 of the present exemplary embodiment, the red light emission period in one frame may be from 0.3 times to 0.6 times the blue light emission period in the one frame.

Accordingly, the luminance half-life of the first electro-optical device 10R having the first light-emitting element 54R having the smallest deterioration rate can be further brought close to the luminance half-life of the second electro-optical device 10B having the second light-emitting element 54B having the greatest deterioration rate, and thus color shifting can be more effectively prevented from being generated in the white synthetic imaging light LW caused by the deterioration rate (lifetime characteristics) of each light-emitting element.

In the optical module 1 of the present exemplary embodiment, the third period in which the third light-emitting control transistor 53G is in the ON-state in one frame is shorter than the second period and longer than the first period. In other words, in the optical module 1 of the present exemplary embodiment, the green light emission period in one frame is shorter than the blue light emission period and longer than the red light emission period.

Accordingly, the luminance half-life of the third electro-optical device 10G having the third light-emitting element 54G having a moderate deterioration rate can be brought close to the luminance half-life of the second electro-optical device 10B having the second light-emitting element 54B having the greatest deterioration rate, thereby increasing effects of preventing color shifting from being generated in the white synthetic imaging light LW caused by the deterioration rate (lifetime characteristics) of each light-emitting element.

In the optical module 1 of the present exemplary embodiment, an area of the first light-emitting element 54R included in the first pixel 11R, an area of the second light-emitting element 54B included in the second pixel 11B, and an area of the third light-emitting element 54G included in the third pixel 11G are the same.

In this way, it is possible to prevent color shifting, caused by the area of the first light-emitting element 54R, the area of the second light-emitting element 54B, and the area of the third light-emitting element 54G being different from each other, from being generated in the synthetic imaging light LW.

Further, the optical module 1 of the present exemplary embodiment includes the first electro-optical device 10R emitting the red first imaging light LR, the second electro-optical device 10B emitting the blue second imaging light LB, and the third electro-optical device 10R emitting the green third imaging light LG.

As a result, the number of wiring lines in each electro-optical device can be reduced, because the number of control lines 32 provided per line in each of the first electro-optical device 10R, the second electro-optical device 10B, and the third electro-optical device 10G is one.

Image Display Device Including Optical Module 1

An image display device including the optical module 1 of the present exemplary embodiment will be described below.

Figure 12:
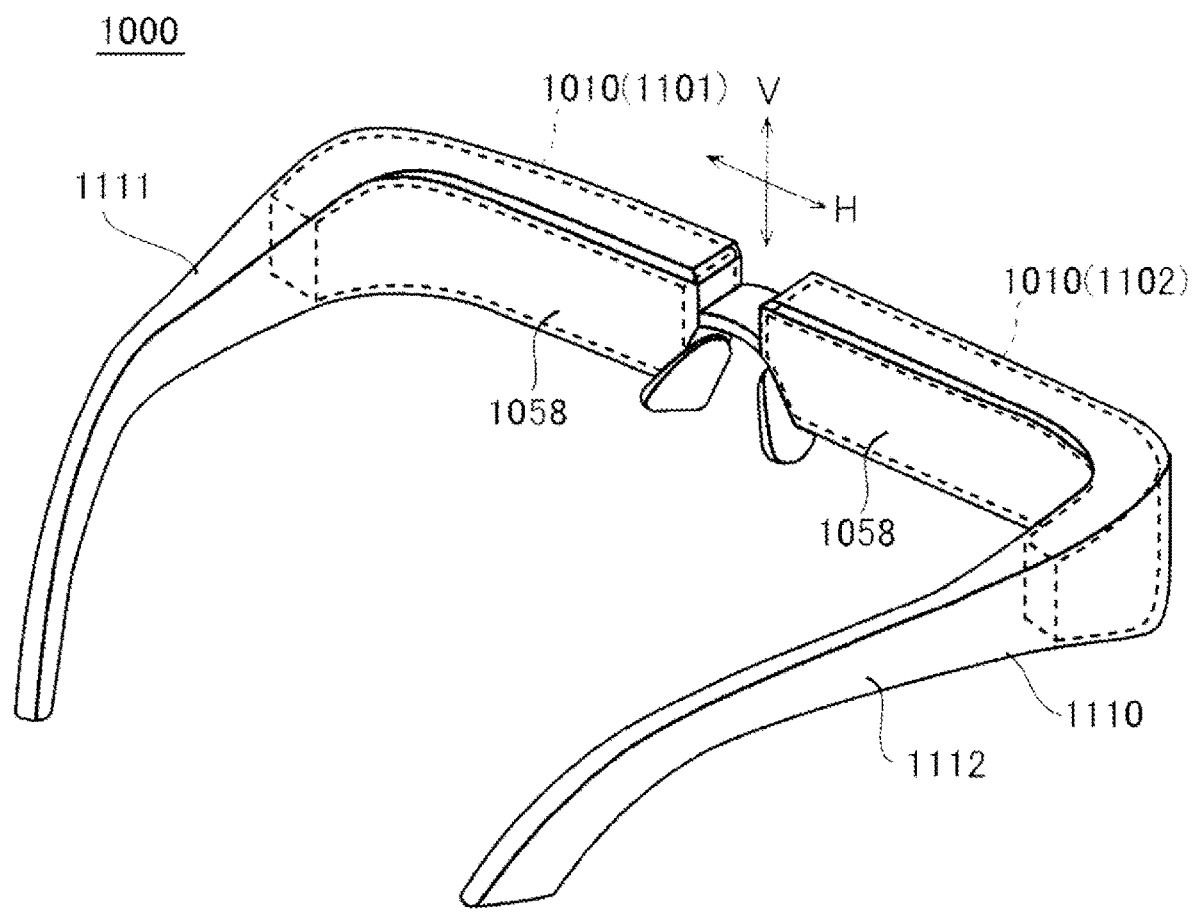
FIG. 12 is a diagram schematically illustrating a head-mounted display apparatus that is an example of an image display device including the optical module according to the present exemplary embodiment.
Figure 13:
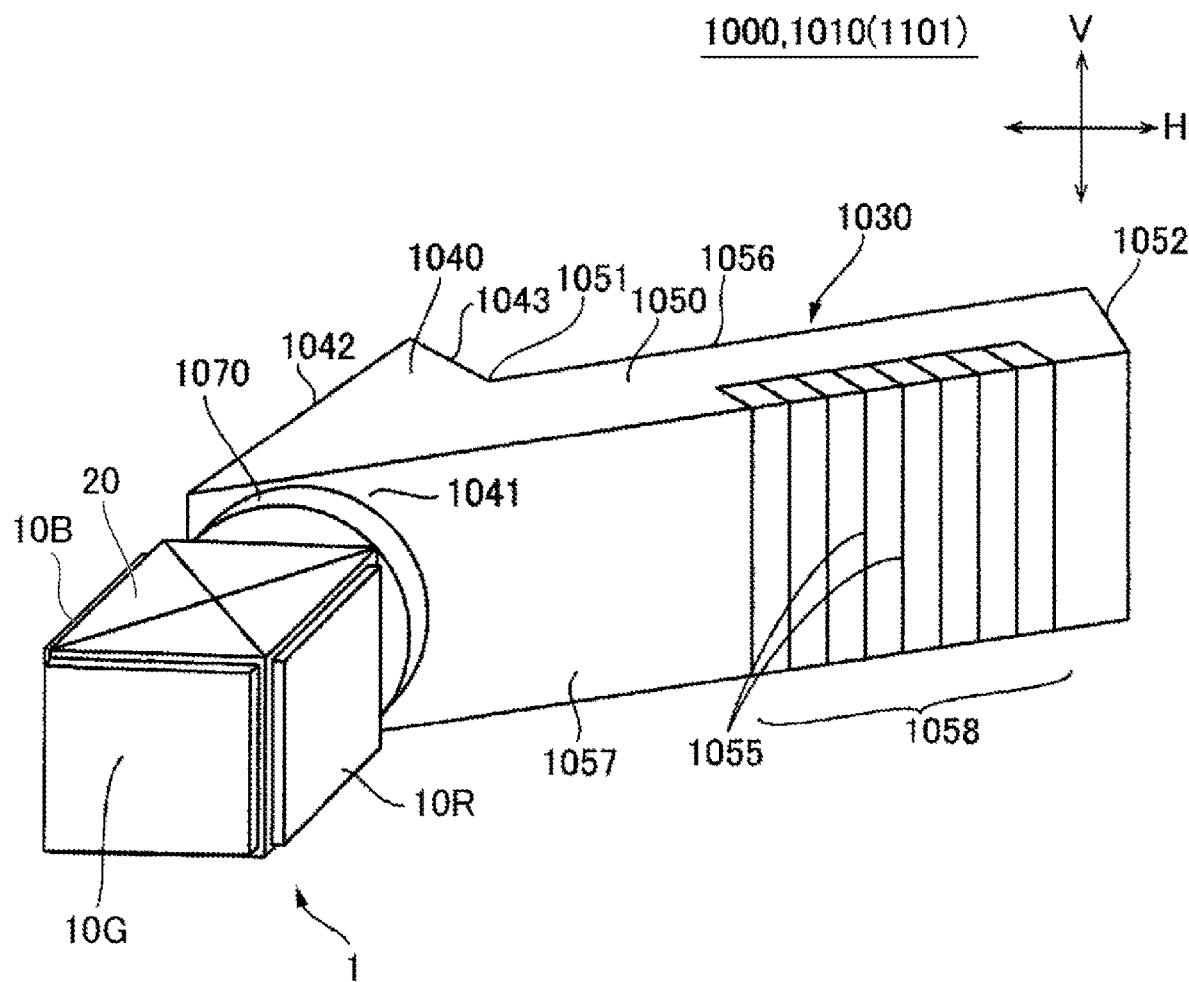
FIG. 13 is a perspective view schematically illustrating a configuration of an optical system of a virtual image display unit in the head-mounted display apparatus.
Figure 14:
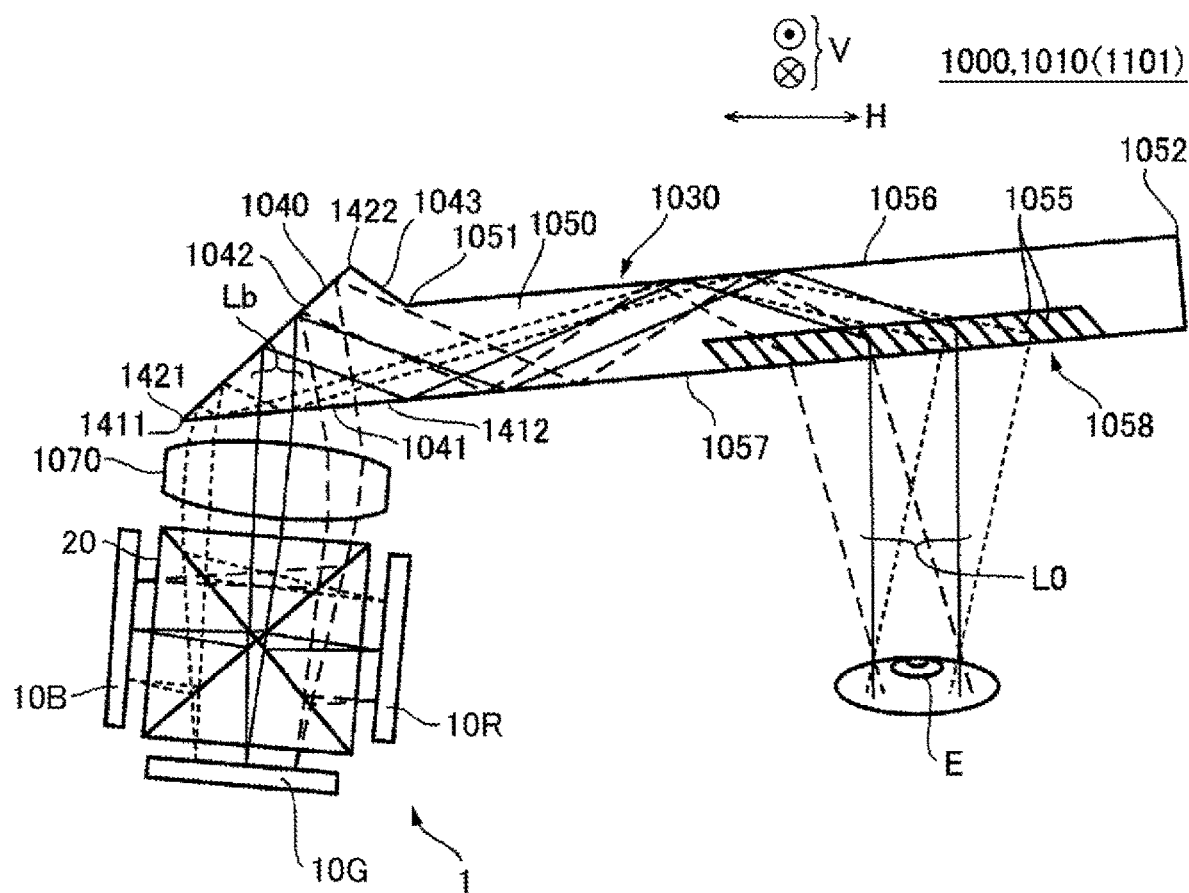
FIG. 14 is an explanatory diagram illustrating optical paths of the optical system of the virtual image display unit in the head-mounted display apparatus.

FIG. 12 is an explanatory diagram of a head-mounted display apparatus (head-mounted display) 1000, which is an example of an image display device including the optical module 1. FIG. 13 is a perspective view schematically illustrating a configuration of an optical system of virtual image display units 1010 illustrated in FIG. 12. FIG. 14 is an explanatory diagram illustrating optical paths of the optical system illustrated in FIG. 13.

As illustrated in FIG. 12, the head-mounted display apparatus 1000 is configured as a see-through type eyeglass display, and includes a frame 1110 provided with temples 1111 and 1112 on left and right sides, respectively. In the head-mounted display apparatus 1000, the virtual image display units 1010 are supported by the frame 1110, and an image emitted from the virtual image display units 1010 is caused to be recognized as a virtual image by a user. In the present exemplary embodiment, the head-mounted display apparatus 1000 is provided with a left-eye display unit 1101 and a right-eye display unit 1102 as the virtual display units 1010. The left-eye display unit 1101 and the right-eye display unit 1102 have the same configuration and are arranged left-right symmetrically.

In the following description, the left-eye display unit 1101 will be mainly described, and the description of the right-eye display unit 1102 will be omitted.

As illustrated in FIGS. 13 and 14, in the head-mounted display apparatus 1000, the left-eye display unit 1101 includes the optical module 1, and a light guiding system 1030 that guides the synthetic imaging light LW emitted from the optical module 1 to an emitting part 1058. A projection lens system 1070 is arranged between the optical module 1 and the light guiding system 1030. The synthetic imaging light LW emitted from the optical module 1 is incident on the light guiding system 1030 via the projection lens system 1070. The projection lens system 1070 is configured by a single collimate lens that has a positive power.

The light guiding system 1030 includes a transmissive incidence portion 1040 from which the synthetic imaging light LW enters, and a transmissive light guiding portion 1050 having one end 1051 side coupled to the incidence portion 1040. In the present exemplary embodiment, the incidence portion 1040 and the light guiding portion 1050 are configured as an integrated transmissive member.

The incidence portion 1040 includes an incident surface 1041 from which the synthetic imaging light LW emitted from the optical module 1 enters, and a reflection surface 1042 that reflects the synthetic imaging light LW that has entered from the incident surface 1041, the synthetic imaging light LW being reflected between the reflection surface 1042 and the incident surface 1041. The incident surface 1041 is a flat surface, an aspherical surface, a free form surface, or the like, and faces the optical module 1 via the projection lens system 1070. The projection lens system 1070 is disposed obliquely such that an interval between the projection lens system 1070 and an end portion 1412 of the incident surface 1041 is larger than an interval between the projection lens system 1070 and an end portion 1411 of the incident surface 1041.

Although no reflection film is formed at the incident surface 1041, the incident surface 1041 fully reflects light that enters at an incident angle equal to or greater than a critical angle. Thus, the incident surface 1041 has a light transmissive property and a light reflecting property. The reflection surface 1042 is a surface that faces the incident surface 1041, and is disposed obliquely such that an end portion 1422 is located further away from the incident surface 1041 than an end portion 1421 of the incident surface 1041. Thus, the incidence portion 1040 has a substantially triangular shape. The reflection surface 1042 is a flat surface, an aspherical surface, a free form surface, or the like. The reflection surface 1042 has a configuration in which a reflective metal layer made, mainly, of aluminum, silver, magnesium, chrome or the like, is formed.

The light guiding portion 1050 includes a first surface 1056 (first reflection surface) that extends from one end 1051 toward the other end 1052 side, a second surface 1057 (second reflection surface) that faces the first surface 1056 in a parallel manner and extends from the one end 1051 side toward the other end 1052 side, and an emitting portion 1058 provided at a portion of the second surface 1057 that is apart from the incidence portion 1040. The first surface 1056 and the reflection surface 1042 of the incidence portion 1040 are continuous via a sloped surface 1043. A thickness of the first surface 1056 and the second surface 1057 is thinner than the incidence portion 1040. The first surface 1056 and the second surface 1057 reflect all the light that is incident at an incident angle equal to or greater than the critical angle, based on a refractive index difference between the light guiding portion 1050 and the outside (the air). Thus, no reflection film is formed at the first surface 1056 and the second surface 1057.

The emitting portion 1058 is configured on a portion of the light guiding portion 1050 on the second surface 1057 side in the thickness direction. In the emitting portion 1058, a plurality of partial reflection surfaces 1055 that are angled obliquely with respect to a normal line with respect to the second surface 1057 are arranged to be mutually parallel to each other. The emitting portion 1058 is a portion of the second surface 1057 that overlaps with the plurality of partial reflection surfaces 1055, and is a region that has a predetermined width in an extending direction of the light guiding portion 1050. Each of the plurality of partial reflection surfaces 1055 is constituted of a dielectric multilayer film. In addition, at least one of the plurality of partial reflection surfaces 1055 may be a composite layer including a dielectric multilayer film and a reflective metal layer (thin film) made mainly of aluminum, silver, magnesium, chrome, or the like. When the partial reflection surface 1055 is configured to include a metal layer, it is possible to obtain an effect of enhancing the reflectance of the partial reflection surface 1055, or to obtain an effect of optimizing the incident angle dependence or the polarization dependence of the transmittance and the reflectance of the partial reflection surface 1055. Note that the emitting portion 1058 may have a mode in which an optical element such as a diffraction grating and a hologram is provided.

In the head-mounted display apparatus 1000 configured in this manner, the synthetic imaging light LW consists of the parallel light that enters from the incidence portion 1040 is refracted on the incident surface 1041 and travels toward the reflection surface 1042. Next, the synthetic imaging light LW is reflected on the reflection surface 1042, and travels toward the incident surface 1041 again. At this time, since the synthetic imaging light LW enters the incident surface 1041 at the incident angle equal to or greater than the critical angle, the synthetic imaging light LW is reflected on the incident surface 1041 toward the light guiding portion 1050, and travels toward the light guiding portion 1050. Note that the incidence portion 1040 is configured such that the synthetic imaging light LW that is the parallel light enters the incident surface 1041. However, it may be possible to employ a configuration in which the incident surface 1041 and the reflection surface 1042 are configured to have a free form curve or the like, and after the synthetic imaging light LW, which is non-parallel light, enters the incident surface 1041, the synthetic imaging light LW is reflected between the reflection surface 1042 and the incident surface 1041 to be converted into the parallel light while being reflected.

In the light guiding portion 1050, the synthetic imaging light LW is reflected between the first surface 1056 and the second surface 1057, and advances. Then, part of the synthetic imaging light LW that enters the partial reflection surface 1055 is reflected on the partial reflection surface 1055 and is emitted from the emitting portion 1058 toward an eye E of an observer. Further, the rest of the synthetic imaging light LW incident on the partial reflection surface 1055 passes through the partial reflection surface 1055 and is incident on the next, adjacent, partial reflection surface 1055. Thus, the synthetic imaging light LW that is reflected on each of the plurality of partial reflection surfaces 1055 is emitted from the emitting portion 1058 toward the eye E of the observer. This enables the observer to recognize a virtual image.

At this time, as for the light entering the light guiding portion 1050 from the outside, this light passes through the partial reflection surfaces 1055 after entering the light guiding portion 1050, and reaches the eye E of the observer. This enables the observer to visually recognize the color image emitted from the optical module 1 and also visually recognize the scenery of the outside world and the like in a see through manner.

According to the head-mounted display apparatus 1000 including the optical module 1 of the present exemplary embodiment as described above, it is possible to suppress generation of color shifting in a color image (virtual image) formed by the synthetic imaging light LW emitted from the optical module 1.

Figure 15:
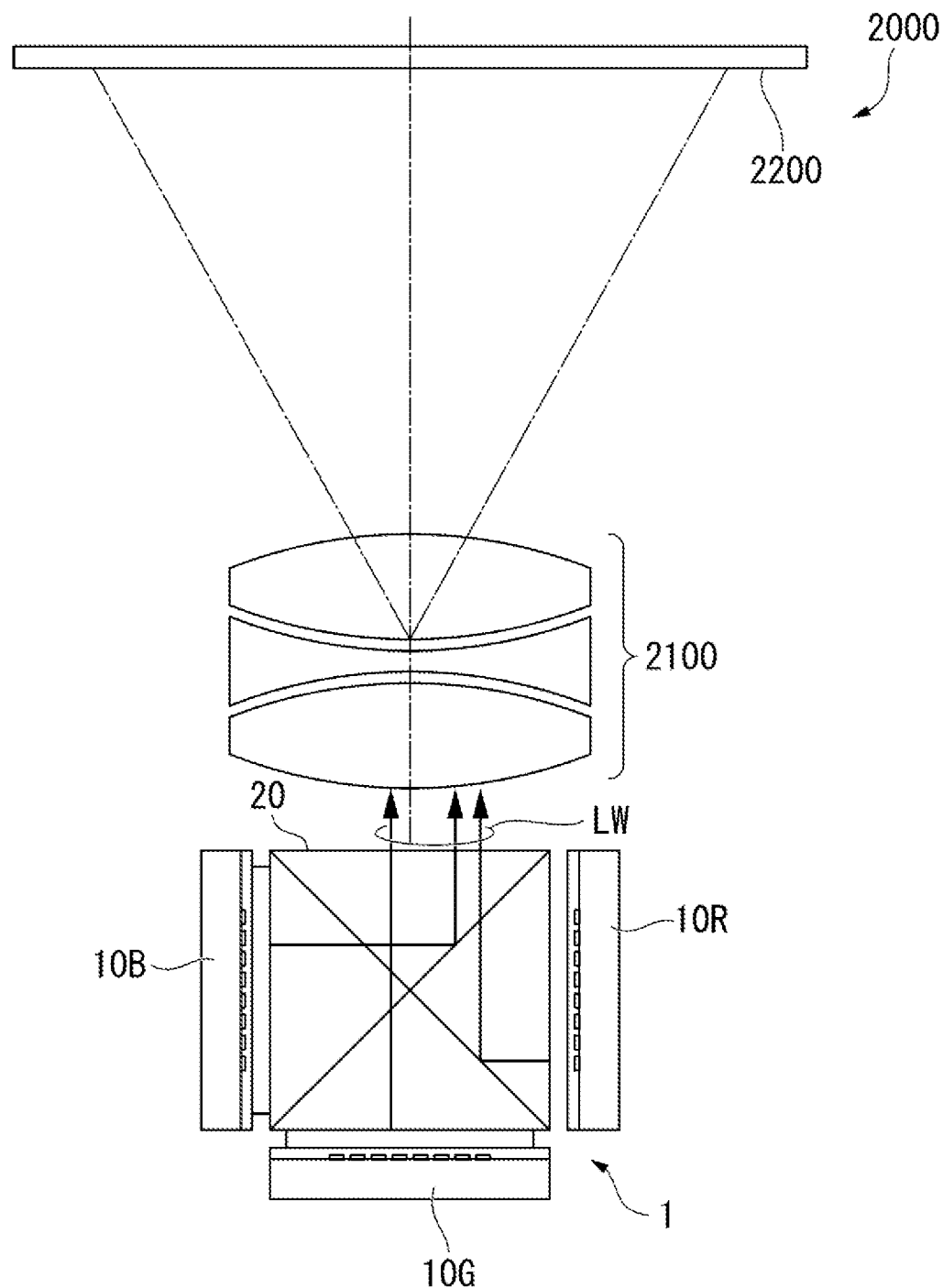
FIG. 15 is a diagram schematically illustrating a projection-type display apparatus that is an example of an image display device including the optical module according to the present exemplary embodiment.

FIG. 15 is a schematic configuration diagram of a projection-type display device (projector) 2000, which is another example of the image display device that includes the optical module 1 according to the present exemplary embodiment. As illustrated in FIG. 15, the projection-type display device 2000 includes the optical module 1 according to the above-described exemplary embodiment, and a projection optical system 2100 that expands the synthetic imaging light LW emitted from the optical module 1 and projects the synthetic imaging light LW onto a projected member 2200 such as a screen.

According to the projection-type display device 2000 provided with the optical module 1 of the present exemplary embodiment as described above, it is possible to suppress generation of color shifting in a color image formed by the synthetic imaging light LW projected onto the projected member 2200.

Electro-Optical Device

Next, an electro-optical device in an exemplary embodiment of the present disclosure will be described.

Figure 16:
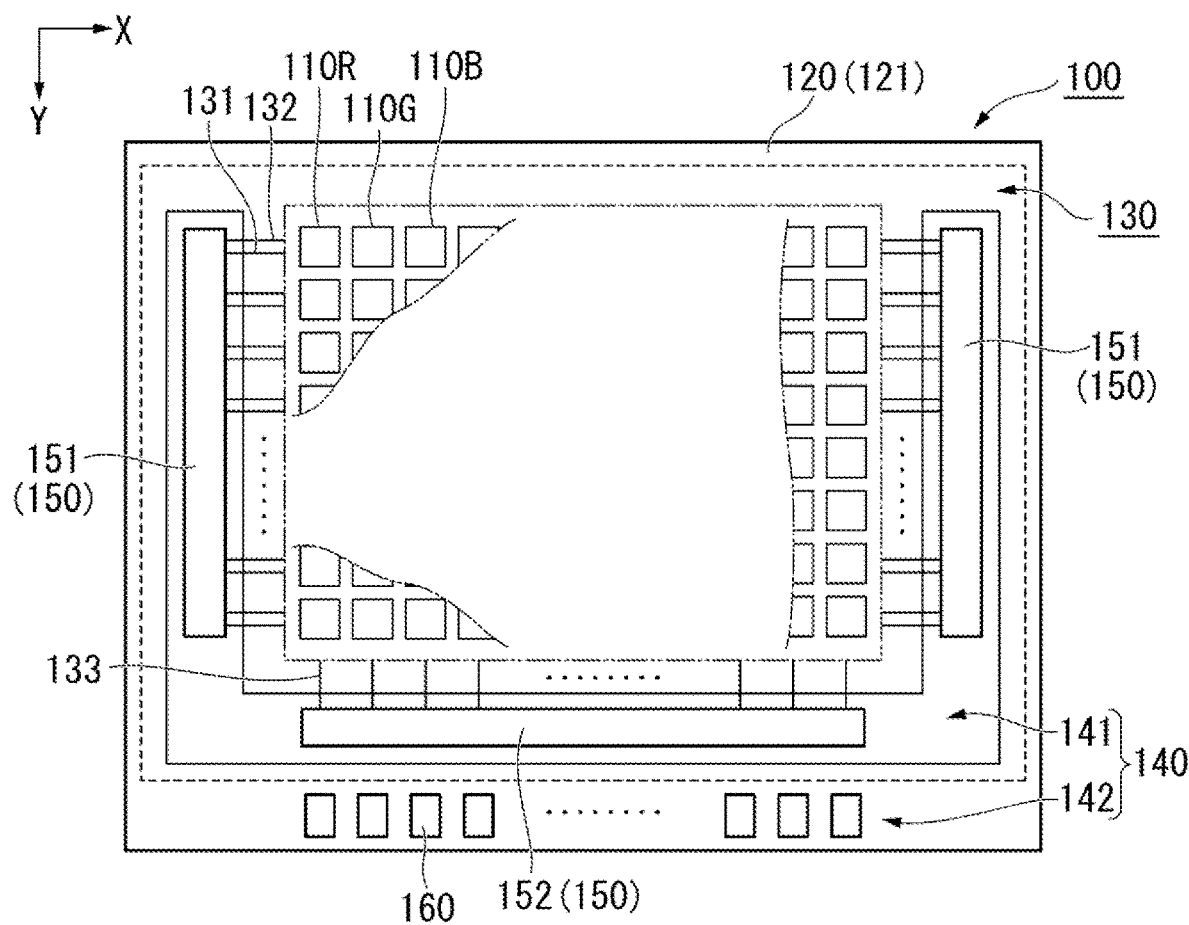
FIG. 16 is a schematic configuration diagram of an electro-optical device in an exemplary embodiment of the present disclosure.

FIG. 16 is a schematic configuration diagram of an electro-optical device 100 in an exemplary embodiment of the present disclosure. In FIG. 16, a horizontal direction of the electro-optical device 100 is an X direction, and a vertical direction of the electro-optical device 100 is a Y direction. The electro-optical device 100 is a light-emitting type electro-optical device that emits imaging light in which three colors are mixed. In the present exemplary embodiment, the electro-optical device 100 is, for example, an organic EL panel. As illustrated in FIG. 16, the electro-optical device 100 includes a plurality of first pixels 110R, a plurality of second pixels 110B, and a plurality of third pixels 110G.

The plurality of first pixels 110R are arranged in a matrix on a substrate of the electro-optical device 100. The first pixel 110R is arranged adjacent to the left of the third pixel 110G in the X direction. The first pixel 110R emits light in a first wavelength region. In the present exemplary embodiment, the light in the first wavelength region is red light. That is, the first wavelength region includes, for example, wavelengths from 610 nm to 680 nm. In the following description, the light in the first wavelength region may be referred to as "red light".

The plurality of second pixels 110B are arranged in a matrix on the substrate of the electro-optical device 100. The second pixel 110B is arranged adjacent to the right of the third pixel 110G in the X direction. The second pixel 110B emits light in a second wavelength region shorter than the first wavelength region. In the present exemplary embodiment, the light in the second wavelength region is blue light. That is, the second wavelength region includes, for example, wavelengths from 450 nm to 490 nm. In the following description, the light in the second wavelength region may be referred to as "blue light".

The plurality of third pixels 110G are arranged in a matrix on the substrate of the electro-optical device 100. The third pixel 110G is arranged between the first pixel 110R and the second pixel 110B in the X direction. The third pixel 110G emits light in a third wavelength region shorter than the first wavelength region, and longer than the second wavelength region. In the present exemplary embodiment, the light in the third wavelength region is green light. That is, the third wavelength region includes, for example, wavelengths from 495 nm to 570 nm. In the following description, the light in the third wavelength region may be referred to as "green light".

In the electro-optical device 100 of the present exemplary embodiment, an area of a first light-emitting element 114R included in the first pixel 110R, an area of a second light-emitting element 114B included in the second pixel 110B, and an area of a third light-emitting element 114G included in the third pixel 110G are the same.

The electro-optical device 100 has a pixel area 130 including the first pixel 110R, the second pixel 110B, and the third pixel 110G, and a non-pixel area 140 surrounding the pixel area 130. The pixel area 130 and the non-pixel area 140 are provided in a first surface 121 of a substrate 120 of the electro-optical device 100.

The non-pixel area 140 includes a peripheral area 141 and a mounting area 142. The pixel area 130 is a rectangular region in which the first pixel 110R, the second pixel 110B, and the third pixel 110G are arranged in a matrix. A plurality of scanning lines 131 extending in the X direction, a plurality of control lines 132 extending in the X direction corresponding to the respective scanning lines 131, and a plurality of data lines 133 extending in the Y direction that intersects the X direction are provided in the pixel area 130. Each of the first pixel 110R, the second pixel 110B, and the third pixel 110G is a region corresponding to each of intersections of the plurality of scanning lines 131 and the plurality of data lines 133. Accordingly, the first pixels 110R, the second pixels 110B, and the third pixels 110G are arranged in a matrix across the X direction and the Y direction.

The peripheral area 141 is a rectangular frame-shaped region that surrounds the pixel area 130. Three driving circuits 150 are provided in the peripheral area 141. The three driving circuits 150 are circuits that drive the first pixel 110R, the second pixel 110B, and the third pixel 110G in the pixel area 130. The drive circuits 150 include two scanning line drive circuits 151 and a data line driving circuit 152. The electro-optical device 100 is an electro-optical device with built-in circuits in which the driving circuit 150 is formed at the first surface 121 of the substrate 120 and that is configured with an active element such as a transistor.

The mounting area 142 is provided on an opposite side to the pixel area 130 with the peripheral area 141 interposed therebetween, that is, on an outside of the peripheral area 141. A plurality of mounting terminals 160 are provided in the mounting area 142. A control signal and power supply potential are supplied to the mounting terminal 160 from various external circuits (not illustrated) including a control circuit and a power supply circuit. The external circuits are mounted to a flexible wiring substrate (not illustrated) coupled to the mounting area 142, for example.

Figure 17:
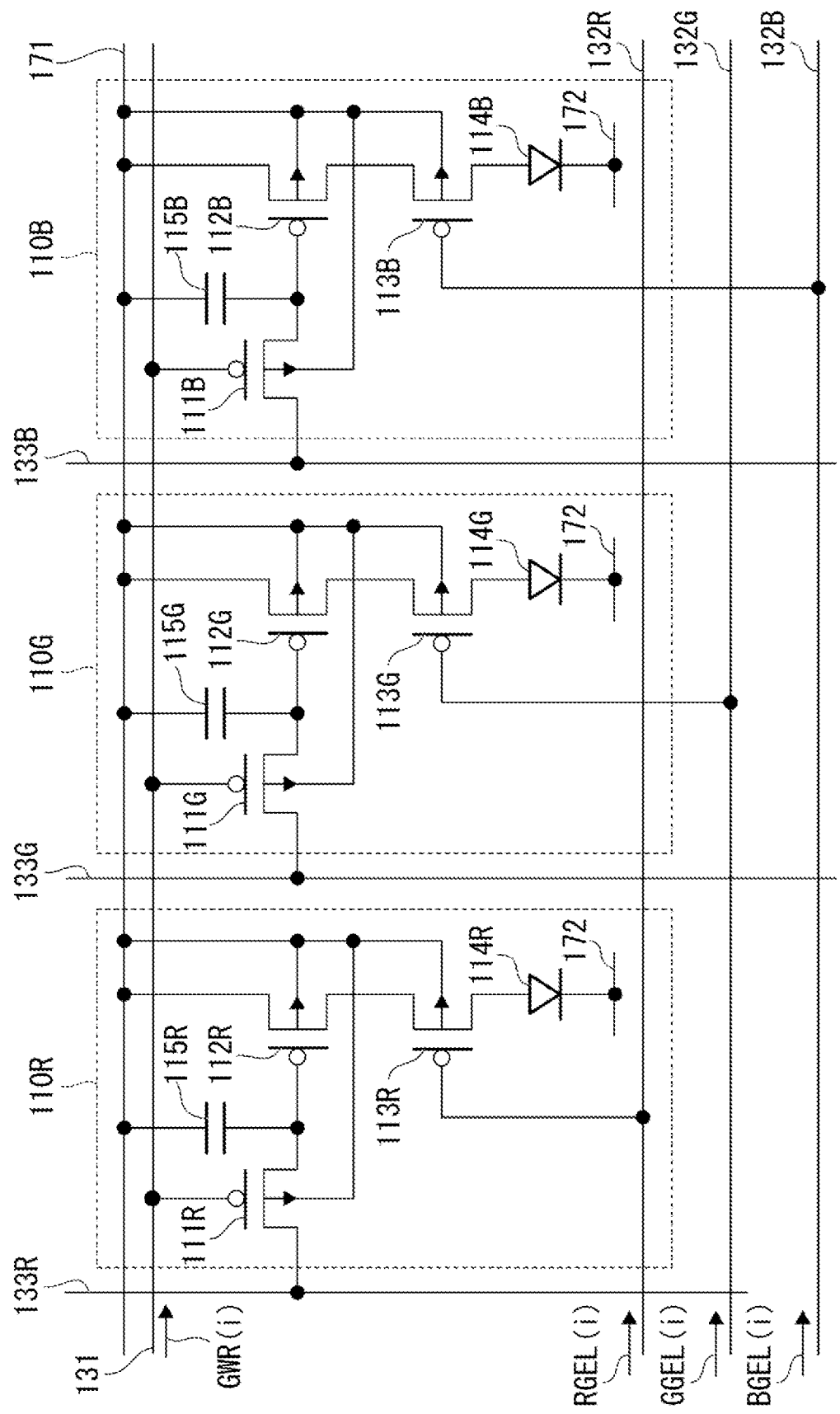
FIG. 17 is an equivalent circuit diagram illustrating a configuration of respective pixel circuits included in a first pixel, a second pixel, and a third pixel provided in the electro-optical device according to the present exemplary embodiment.

FIG. 17 is an equivalent circuit diagram illustrating a configuration of pixel circuits included in the first pixel 110R, the second pixel 110B, and the third pixel 110G, respectively. Hereinafter, description will be given using, as an example, pixel circuits included in the first pixel 110R located in the i-th row and the j-th column, the third pixel 110G located in the i-th row and a j+1-th column, and the second pixel 110B located in the i-th row and a j+2-th column, respectively.

As illustrated in FIG. 17, the pixel circuit of the first pixel 110R has a first selection transistor 111R, a first drive transistor 112R, a first light-emitting control transistor 113R, the first light-emitting element 114R, and a first retention capacitor 115R. In the present exemplary embodiment, the first selection transistor 111R, the first drive transistor 112R, and the first light-emitting control transistor 113R are each a p-channel MOS-FET.

A gate electrode of the first selection transistor 111R is electrically coupled to the scanning line 131 in the i-th row. Another of source/drain regions of the first selection transistor 111R is electrically coupled to the first data line 133R in the j-th column. One of the source/drain regions of the first selection transistor 111R is electrically coupled to a gate electrode of the first drive transistor 112R, and one electrode of the first retention capacitor 115R. A back gate of the first selection transistor 111R is electrically coupled to a power source wiring line 171 to which power supply potential is applied.

The gate electrode of the first drive transistor 112R is electrically coupled to the one of the source/drain regions of the first selection transistor 111R, and to the one electrode of the first retention capacitor 115R. One of source/drain regions of the first drive transistor 112R is electrically coupled to the power source wiring line 171. Another of the source/drain regions of the first drive transistor 112R is electrically coupled to one of source/drain regions of the first light-emitting control transistor 113R. A back gate of the first drive transistor 112R is electrically coupled to the power source wiring line 171.

A gate electrode of the first light-emitting control transistor 113R is electrically coupled to the first control line 132R in the i-th row. The one of the source/drain regions of the first light-emitting control transistor 113R is electrically coupled to the other of the source/drain regions of the first drive transistor 112R. Another of the source/drain regions of the first light-emitting control transistor 113R is electrically coupled to an anode of the first light-emitting element 114R. A back gate of the first light-emitting control transistor 113R is electrically coupled to the power source wiring line 171.

The first light-emitting element 114R is a light-emitting element that emits light in the first wavelength region, that is, red light. The first light-emitting element 114R has a configuration in which a light-emitting layer is sandwiched between an anode and a cathode, and is, for example, an organic EL diode. The anode of the first light-emitting element 114R is electrically coupled to the other of the source/drain regions of the first light-emitting control transistor 113R. The cathode of the first light-emitting element 114R is electrically coupled to a common wiring line 172 to which common potential is applied.

The first retention capacitor 115R is a capacitor for retaining gate potential of the first drive transistor 112R. The one electrode of the first retention capacitor 115R is electrically coupled to the one of the source/drain regions of the first selection transistor 111R, and to the gate electrode of the first drive transistor 112R. Another electrode of the first retention capacitor 115R is electrically coupled to the power source wiring line 171. Note that, as the first retention capacitor 115R, a capacitor parasitic on the gate electrode of the first drive transistor 112R may be used, or a capacitor formed by sandwiching an insulating layer between mutually different conductive layers in a silicon substrate may be used.

The pixel circuit of the second pixel 110B has a second selection transistor 111B, a second drive transistor 112B, a second light-emitting control transistor 113B, the second light-emitting element 114B, and a second retention capacitor 115B. In the present exemplary embodiment, the second selection transistor 111B, the second drive transistor 112B, and the second light-emitting control transistor 113B are each a p-channel MOS-FET.

A gate electrode of the second selection transistor 111B is electrically coupled to the scanning line 131 in the i-th row. Another of source/drain regions of the second selection transistor 111B is electrically coupled to the second data line 133B in the j+2-th column. One of the source/drain regions of the second selection transistor 111B is electrically coupled to a gate electrode of the second drive transistor 112B, and to one electrode of the second retention capacitor 115B. A back gate of the second selection transistor 111B is electrically coupled to the power source wiring line 171.

The gate electrode of the second drive transistor 112B is electrically coupled to the one of the source/drain regions of the second selection transistor 111B, and to the one electrode of the second retention capacitor 115B. One of source/drain regions of the second drive transistor 112B is electrically coupled to the power source wiring line 171. Another of the source/drain regions of the second drive transistor 112B is electrically coupled to one of source/drain regions of the second light-emitting control transistor 113B. A back gate of the second drive transistor 112B is electrically coupled to the power source wiring line 171.

A gate electrode of the second light-emitting control transistor 113B is electrically coupled to the second control line 132B in the i-th row. The one of source/drain regions of the second light-emitting control transistor 113B is electrically coupled to the other of the source/drain regions of the second drive transistor 112B. Another of the source/drain regions of the second light-emitting control transistor 113B is electrically coupled to an anode of the second light-emitting element 114B. A back gate of the second light-emitting control transistor 113B is electrically coupled to the power source wiring line 171.

The second light-emitting element 114B is a light-emitting element that emits light in the second wavelength region, that is, blue light. The second light-emitting element 114B has a configuration in which a light-emitting layer is sandwiched between the anode and a cathode, and is, for example, an organic EL diode. The anode of the second light-emitting element 114B is electrically coupled to the other of the source/drain regions of the second light-emitting control transistor 113B. The cathode of the second light-emitting element 114B is electrically coupled to the common wiring line 172.

The second retention capacitor 115B is a capacitor for retaining gate potential of the second drive transistor 112B. The one electrode of the second retention capacitor 115B is electrically coupled to the one of the source/drain regions of the second selection transistor 111B, and to the gate electrode of the second drive transistor 112B. Another electrode of the second retention capacitor 115B is electrically coupled to the power source wiring line 171. Note that, as the second retention capacitor 115B, a capacitor parasitic on the gate electrode of the second drive transistor 112B may be used, or a capacitor formed by sandwiching an insulating layer between mutually different conductive layers in a silicon substrate may be used.

The pixel circuit of the third pixel 110G has a third selection transistor 111G, a third drive transistor 112G, a third light-emitting control transistor 113G, the third light-emitting element 114G, and a third retention capacitor 115G. In the present exemplary embodiment, the third selection transistor 111G, the third drive transistor 112G, and the third light-emitting control transistor 113G are each a p-channel MOS-FET.

A gate electrode of the third selection transistor 111G is electrically coupled to the scanning line 131 in the i-th row. Another of source/drain regions of the third selection transistor 111G is electrically coupled to the third data line 133G in the j+1-th column. One of the source/drain regions of the third selection transistor 111G is electrically coupled to a gate electrode of the third drive transistor 112G, and to one electrode of the third retention capacitor 115G. A back gate of the third selection transistor 111G is electrically coupled to the power source wiring line 171.

The gate electrode of the third drive transistor 112G is electrically coupled to the one of the source/drain regions of the third selection transistor 111G, and to the one electrode of the third retention capacitor 115G. One of source/drain regions of the third drive transistor 112G is electrically coupled to the power source wiring line 171. Another of the source/drain regions of the third drive transistor 112G is electrically coupled to one of source/drain regions of the third light-emitting control transistor 113G. A back gate of the third drive transistor 112G is electrically coupled to the power source wiring line 171.

A gate electrode of the third light-emitting control transistor 113G is electrically coupled to the third control line 132G in the i-th row. The one of the source/drain regions of the third light-emitting control transistor 113G is electrically coupled to the other of the source/drain regions of the third drive transistor 112G. Another of the source/drain regions of the third light-emitting control transistor 113G is electrically coupled to an anode of the third light-emitting element 114G. A back gate of the third light-emitting control transistor 113G is electrically coupled to the power source wiring line 171.

The third light-emitting element 114G is a light-emitting element that emits light in the third wavelength region, that is, green light. The third light-emitting element 114G has a configuration in which a light-emitting layer is sandwiched between the anode and a cathode, and is, for example, an organic EL diode. The anode of the third light-emitting element 114G is electrically coupled to the other of the source/drain regions of the third light-emitting control transistor 113G. The cathode of the third light-emitting element 114G is electrically coupled to the common wiring line 172.

The third retention capacitor 115G is a capacitor for retaining gate potential of the third drive transistor 112G. The one electrode of the third retention capacitor 115G is electrically coupled to the one of the source/drain regions of the third selection transistor 111G, and to the gate electrode of the third drive transistor 112G. Another electrode of the third retention capacitor 115G is electrically coupled to the power source wiring line 171. Note that, as the third retention capacitor 115G, a capacitor parasitic on the gate electrode of the third drive transistor 112G may be used, or a capacitor formed by sandwiching an insulating layer between mutually different conductive layers in a silicon substrate may be used.

In the pixel circuit configured as described above, when the scanning signal GWR(i) supplied to the scanning line 131 in the i-th row is at the high level, the first selection transistor 111R, the second selection transistor 111B, and the third selection transistor 111G are each in the OFF-state. On the other hand, when the scanning signal GWR(i) is at the low level, the first selection transistor 111R, the second selection transistor 111B, and the third selection transistor 111G are each in the ON-state.

When the first selection transistor 111R is in the ON-state, a charging current flows through the first retention capacitor 115R in accordance with a potential difference VDR between potential of the first data line 133R and potential of the power source wiring line 171, and thus the first retention capacitor 115R is charged until a voltage between electrodes of the first retention capacitor 115R becomes the potential difference VDR. A drive current flowing between the other of the source/drain regions of the first drive transistor 112R and the one of the source/drain regions varies depending on the gate potential of the first drive transistor 112R, that is the voltage between electrodes of the first retention capacitor 115R.

When the second selection transistor 111B is in the ON-state, a charging current flows through the second retention capacitor 115B in accordance with a potential difference VDB between potential of the second data line 133B and potential of the power source wiring line 171, and thus the second retention capacitor 115B is charged until a voltage between electrodes of the second retention capacitor 115B becomes the potential difference VDB. A drive current flowing between the other of the source/drain regions of the second drive transistor 112B and the one of the source/drain regions varies depending on the gate potential of the second drive transistor 112B, that is the voltage between electrodes of the second retention capacitor 115B.

When the third selection transistor 111G is in the ON-state, a charging current flows through the third retention capacitor 115G in accordance with a potential difference VDG between potential of the third data line 133G and potential of the power source wiring line 171, and thus the third retention capacitor 115G is charged until a voltage between electrodes of the third retention capacitor 115G becomes the potential difference VDG. A drive current flowing between the other of the source/drain regions of the third drive transistor 112G and the one of the source/drain regions varies depending on the gate potential of the third drive transistor 112G, that is the voltage between electrodes of the third retention capacitor 115G.

When the first control signal RGEL(i) supplied to the first control line 132R in the i-th row is at the high level, the first light-emitting control transistor 113R is in the OFF-state. When the first light-emitting control transistor 113R is in the OFF-state, the anode of the first light-emitting element 114R is in a state of electrically uncoupled from the other of the source/drain regions of the first drive transistor 112R, thus no drive current flows to the first light-emitting element 114R via the first drive transistor 112R. That is, when the first light-emitting control transistor 113R is in the OFF-state, the first light-emitting element 114R does not emit light.

On the other hand, when the first control signal RGEL(i) is at the low level, the first light-emitting control transistor 113R is in the ON-state. When the first light-emitting control transistor 113R is in the ON-state, the anode of the first light-emitting element 114R is brought into a state of electrically coupled to the other of the source/drain regions of the first drive transistor 112R via the first light-emitting control transistor 113R, thus a drive current having a current value corresponding to a voltage retained by the first retention capacitor 115R flows to the first light-emitting element 114R via the first drive transistor 112R. That is, when the first light-emitting control transistor 113R is in the ON-state, the first light-emitting element 114R emits light in accordance with the drive current. Intensity of red light emitted from the first light-emitting element 114R varies depending on a value of a drive current, that is, the voltage retained by the first retention capacitor 115R.

When the second control signal BGEL(i) supplied to the second control line 132B in the i-th row is at the high level, the second light-emitting control transistor 113B is in the OFF-state. When the second light-emitting control transistor 113B is in the OFF-state, the anode of the second light-emitting element 114B is in a state of electrically uncoupled from the other of the source/drain regions of the second drive transistor 112B, thus no drive current flows to the second light-emitting element 114B via the second drive transistor 112B. That is, when the second light-emitting control transistor 113B is in the OFF-state, the second light-emitting element 114B does not emit light.

On the other hand, when the second control signal BGEL(i) is at the low level, the second light-emitting control transistor 113B is in the ON-state. When the second light-emitting control transistor 113B is in the ON-state, the anode of the second light-emitting element 114B is brought into a state of electrically coupled to the other of the source/drain regions of the second drive transistor 112B via the second light-emitting control transistor 113B, thus a drive current having a current value corresponding to a voltage retained by the second retention capacitor 115B flows to the second light-emitting element 114B via the second drive transistor 112B. That is, when the second light-emitting control transistor 113B is in the ON-state, the second light-emitting element 114B emits light in accordance with the drive current. Intensity of blue light emitted from the second light-emitting element 114B varies depending on a value of the drive current, that is, the voltage retained by the second retention capacitor 115B.

When the third control signal GGEL(i) supplied to the third control line 132G in the i-th row is at the high level, the third light-emitting control transistor 113G is in the OFF-state. When the third light-emitting control transistor 113G is in the OFF-state, the anode of the third light-emitting element 114G is in a state of electrically uncoupled from the other of the source/drain regions of the third drive transistor 112G, thus no drive current flows to the third light-emitting element 114G via the third drive transistor 112G. That is, when the third light-emitting control transistor 113G is in the OFF-state, the third light-emitting element 114G does not emit light.

On the other hand, when the third control signal GGEL(i) is at the low level, the third light-emitting control transistor 113G is in the ON-state. When the third light-emitting control transistor 113G is in the ON-state, the anode of the third light-emitting element 114G is brought into a state of electrically coupled to the other of the source/drain regions of the third drive transistor 112G via the third light-emitting control transistor 113G, thus a drive current having a current value corresponding to a voltage retained by the third retention capacitor 115G flows to the third light-emitting element 114G via the third drive transistor 112G. That is, when the third light-emitting control transistor 113G is in the ON-state, the third light-emitting element 114G emits light in accordance with the drive current. Intensity of green light emitted from the third light-emitting element 114G varies depending on a value of the drive current, that is, the voltage retained by the third retention capacitor 115G.

Similar to the optical module 1 of the exemplary embodiment described above, in the electro-optical device 100 of the present exemplary embodiment, the first period in which the first light-emitting control transistor 113R is in the ON-state in one frame is shorter than the second period in which the second light-emitting control transistor 113B is in the ON-state in the one frame. In other words, in the electro-optical device 100 of the present exemplary embodiment, the red light emission period in one frame is shorter than the blue light emission period in the one frame.

According to the electro-optical device 100 of the present exemplary embodiment as described above, similar to the optical module 1, generation of color shifting in white imaging light caused by a deterioration rate (lifetime characteristics) of each light-emitting element can be prevented.

In addition, in the electro-optical device 100 of the present exemplary embodiment, the first period in which the first light-emitting control transistor 113R is in the ON-state in one frame may be from 0.3 times to 0.6 times the second period in which the second light-emitting control transistor 113B is in the ON-state in the one frame. In other words, in the electro-optical device 1 of the present exemplary embodiment, the red light emission period in one frame may be from 0.3 times to 0.6 times the blue light emission period in the one frame.

According to the electro-optical device 100 of the present exemplary embodiment as described above, similar to the optical module 1, generation of color shifting in white imaging light caused by a deterioration rate (lifetime characteristics) of each light-emitting element can be prevented more effectively.

In addition, in the electro-optical device 100 of the present exemplary embodiment, a third period in which the third light-emitting control transistor 113G is in the ON-state in one frame is shorter than the second period and longer than the first period. In other words, in the electro-optical device 100 of the present exemplary embodiment, the green light emission period in one frame is shorter than the blue light emission period and longer than the red light emission period.

According to the electro-optical device 100 of the present exemplary embodiment as described above, similar to the optical module 1, effects of preventing generation of color shifting in the white synthetic imaging light LW caused by a deterioration rate (lifetime characteristics) of each light-emitting element increase.

In addition, in the electro-optical device 100 according to the present exemplary embodiment, an area of the first light-emitting element 114R, an area of the second light-emitting element 114B, and an area of the third light-emitting element 114G are the same.

In this way, it is possible to prevent color shifting, caused by the area of the first light-emitting element 114R, the area of the second light-emitting element 114B, and the area of the third light-emitting element 114G being different from each other, from being generated in imaging light.

Furthermore, the electro-optical device 100 of the present exemplary embodiment includes the first pixel 110R that emits red light, the second pixel 110B that emits blue light, and the third pixel 110G that emits green light. In other words, the electro-optical device 100 of the present exemplary embodiment generates, by itself, imaging light in which the three colors are mixed.

By configuring an image display device as described below using the electro-optical device 100 of the present exemplary embodiment as described above, it is possible to reduce in size of the image display device.

Image Display Device Including Electro-Optical Device 100

Figure 18:
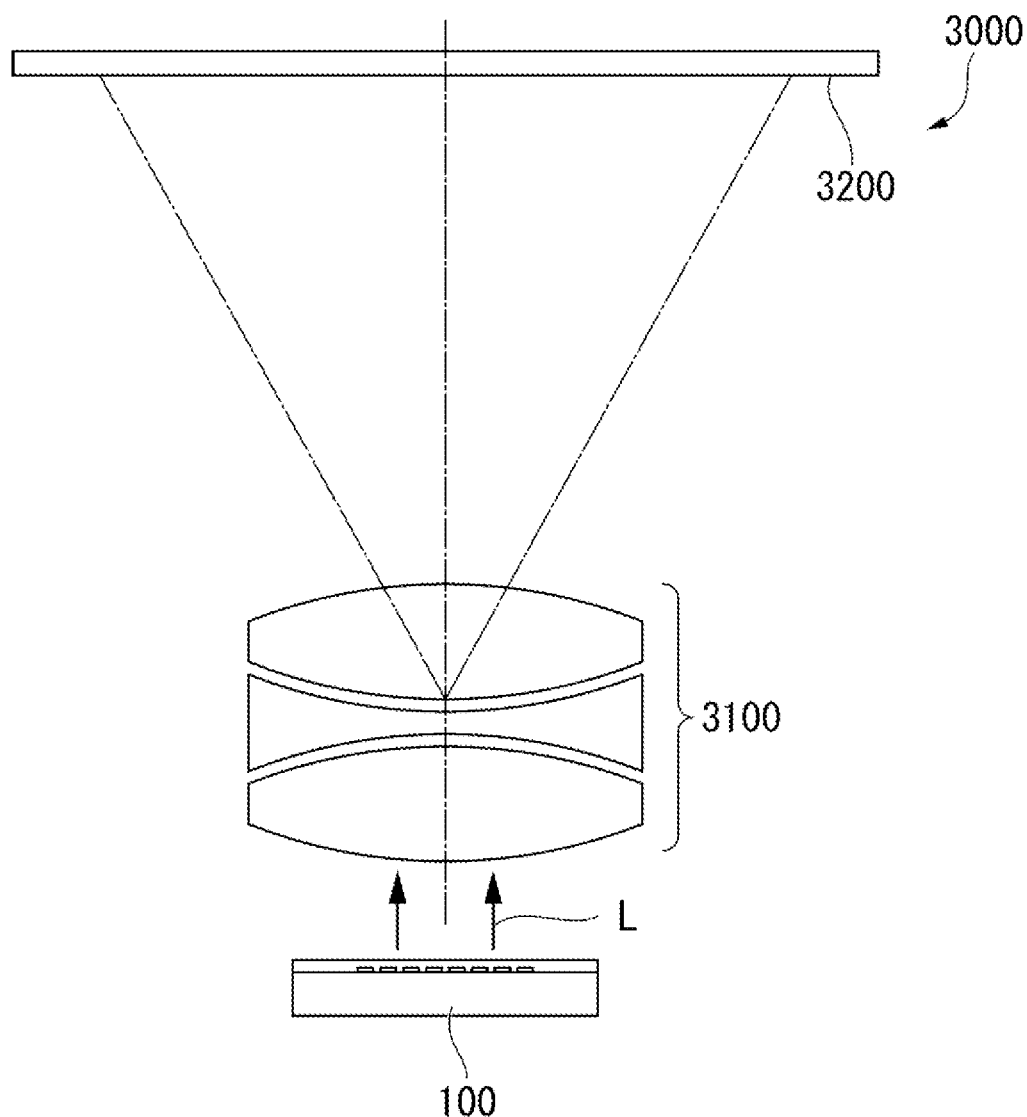
FIG. 18 is a diagram schematically illustrating a projection-type display apparatus that is an example of an image display device including the electro-optical device according to the present exemplary embodiment.

FIG. 18 is a schematic configuration diagram of a projection-type display device (projector) 3000, which is an example of an image display device that includes the electro-optical device 100 according to the present exemplary embodiment. As illustrated in FIG. 18, the projection-type display device 3000 includes the electro-optical device 100 according to the present exemplary embodiment, and a projection optical system 3100 that enlarges imaging light L in which three colors are mixed emitted from the electro-optical apparatus 100 and projects the imaging light L onto a projected member 3200 such as a screen.

According to the projection-type display device 3000 including the electro-optical device 100 according to the present exemplary embodiment as described above, it is possible to suppress generation of color shifting in a color image formed by the imaging light L projected onto the projected member 3200. In addition, as described above, by using the electro-optical device 100 of the present exemplary embodiment, it is possible to achieve reduction in size of the projection-type display device 3000.

Modification Example

Note that the technical scope of the present disclosure is not limited to the above-described embodiments, and various modifications can be made to the above-described embodiments without departing from the spirit and gist of the present disclosure.

Figure 19:
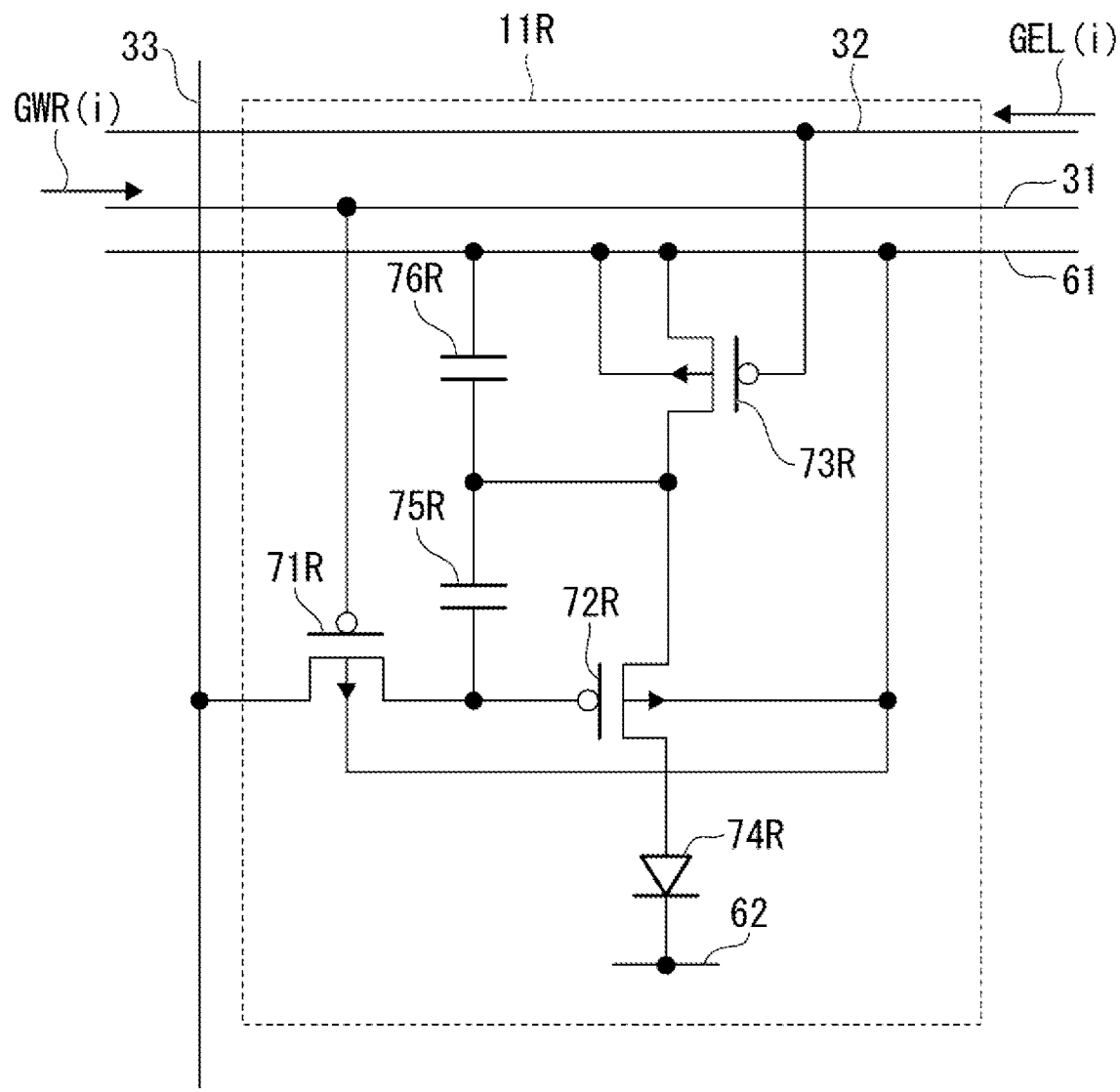
FIG. 19 is a diagram illustrating a modified example of the pixel circuit.

For example, the pixel circuit of the first pixel 11R illustrated in FIG. 3 may be changed to a pixel circuit illustrated in FIG. 19. As illustrated in FIG. 19, the pixel circuit of the first pixel 11R in a modified example has a first selection transistor 71R, a first drive transistor 72R, a first light-emitting control transistor 73R, a first light-emitting element 74R, a first retention capacitor 75R, and a first auxiliary capacitance 76R. The first selection transistor 71R, the first drive transistor 72R, and the first light-emitting control transistor 73R are each a p-channel MOS-FET.

A gate electrode of the first selection transistor 71R is electrically coupled to the scanning line 31 in an i-th row. Another of source/drain regions of the first selection transistor 71R is electrically coupled to the data line 33 in a j-th column. One of the source/drain regions of the first selection transistor 71R is electrically coupled to a gate electrode of the first drive transistor 72R and one electrode of the first retention capacitor 75R. A back gate of the first selection transistor 71R is electrically coupled to the power source wiring line 61.

A gate electrode of the first drive transistor 72R is electrically coupled to the one of the source/drain regions of the first selection transistor 71R, and to the one electrode of the first retention capacitor 75R. One of source/drain regions of the first drive transistor 72R is electrically coupled to another of source/drain regions of the first light-emitting control transistor 73R, and to another electrode of the first retention capacitor 75R. Another of the source/drain regions of the first drive transistor 72R is electrically coupled to an anode of the first light-emitting element 74R. A back gate of the first drive transistor 72R is electrically coupled to the power source wiring line 61.

A gate electrode of the first light-emitting control transistor 73R is electrically coupled to the control line 32 in the i-th row. One of the source/drain regions of the first light-emitting control transistor 73R is electrically coupled to the power source wiring line 61. The other of the source/drain regions of the first light-emitting control transistor 73R is electrically coupled to the one of the source/drain regions of the first drive transistor 72R, and to the other electrode of the first retention capacitor 75R. A back gate of the first light-emitting control transistor 73R is electrically coupled to the power source wiring line 61.

The first light-emitting element 74R is a light-emitting element that emits light in a first wavelength region, that is, red light. The first light-emitting element 74 R is, for example, an organic EL diode. The anode of the first light-emitting element 74R is electrically coupled to the other of the source/drain regions of the first drive transistor 72R. A cathode of the first light-emitting element 74R is electrically coupled to the common wiring line 62.

The first retention capacitor 75R is a capacitor for retaining gate potential of the first drive transistor 72R. The one electrode of the first retention capacitor 75R is electrically coupled to the one of the source/drain regions of the first selection transistor 71R, and to the gate electrode of the first drive transistor 72R. The other electrode of the first retention capacitor 75R is electrically coupled to one electrode of the first auxiliary capacitor 76R, the one of the source/drain regions of the first drive transistor 72R, and the other of the source/drain regions of the first light-emitting control transistor 73R. Note that, as the first retention capacitor 75R, a capacitor parasitic on the gate electrode of the first drive transistor 72R may be used, or a capacitor formed by sandwiching an insulating layer between mutually different conductive layers in a silicon substrate may be used.

The first auxiliary capacitance 76R is a capacitor that assists the first retention capacitor 75R. The one electrode of the first auxiliary capacitor 76R is electrically coupled to another electrode of the first retention capacitor 75R, the one of the source/drain regions of the first drive transistor 72R, and the other of the source/drain regions of the first light-emitting control transistor 73R. The other electrode of the first auxiliary capacitor 76R is electrically coupled to the power source wiring line 61. Note that, as the first auxiliary capacitor 76R, a capacitor parasitic between the one of the source/drain regions of the first light-emitting control transistor 73R and the other of the source/drain regions may be used, and a capacitor formed by sandwiching an insulating layer between mutually different conductive layers in a silicon substrate may be used.

The pixel circuit illustrated in FIG. 19 may be used not only as the pixel circuit of the first pixel 11R, but also as a pixel circuit of each of the second pixel 11B, the third pixel 11G, the first pixel 110R, the second pixel 110B, and the third pixel 110G.

In the exemplary embodiment described above, the embodiment in which each light-emitting element is the organic EL diode is exemplified, but the present disclosure is not limited thereto. As each light-emitting element, other light-emitting element such as an inorganic EL element, an LED array, an organic LED, a laser array, a quantum dot light-emitting element, or the like may be used.

In the exemplary embodiment described above, the head-mounted display apparatus 1000 and the projection-type display apparatus 2000 have been exemplified as the image display device including the optical module 1, but the optical module of the present disclosure can be applied to various forms of image display devices. In addition, in the above-described exemplary embodiment, the projection-type display apparatus 3000 has been exemplified as the image display device including the electro-optical device 100, but the electro-optical device according to the present disclosure can be applied to various forms of image display devices.

An optical module according to an aspect of the present disclosure may have the following configuration.

An optical module according to an aspect of the present disclosure includes a first electro-optical device having a first light-emitting element for emitting light in a first wavelength region, and a first light-emitting control transistor corresponding to the first light-emitting element, a second electro-optical device having a second light-emitting element for emitting light in a second wavelength region shorter than the first wavelength region, and a second light-emitting control transistor corresponding to the second light-emitting element, and a prism configured to synthesize light emitted from the first electro-optical device, and light emitted from the second electro-optical device, wherein a first period in which the first light-emitting control transistor is in an ON-state in one frame is shorter than a second period in which the second light-emitting control transistor is in an ON-state in the one frame.

In an optical module according to an aspect of the present disclosure, the first period may be from 0.3 times to 0.6 times the second period.

In an optical module according to an aspect of the present disclosure, an area of the first light-emitting element may be the same as an area of the second light-emitting element.

An optical module according to an aspect of the present disclosure includes a third electro-optical device having a third light-emitting element for emitting light in a third wavelength region shorter than the first wavelength region and longer than the second wavelength region, and a third light-emitting control transistor corresponding to the third light-emitting element, wherein the prism synthesizes light emitted from the first electro-optical device, light emitted from the second electro-optical device, and light emitted from the third electro-optical device, and a third period in which the third light-emitting control transistor is in an ON-state in the one frame may be shorter than the second period and longer than the first period.

In an optical module of an aspect of the present disclosure, an area of the first light-emitting element, an area of the second light-emitting element, and an area of the third light-emitting element may be the same.

An electro-optical device according to an aspect of the present disclosure may have the following configuration.

An electro-optical device according to an aspect of the present disclosure includes a first pixel configured to emit light in a first wavelength region, and a second pixel configured to emit light in a second wavelength region shorter than the first wavelength region, wherein the first pixel includes a first light-emitting element, and a first light-emitting control transistor corresponding to the first light-emitting element, the second pixel includes a second light-emitting element, and a second light-emitting control transistor corresponding to the second light-emitting element, and a first period in which the first light-emitting control transistor is in an ON-state in one frame is shorter than a second period in which the second light-emitting control transistor is in an ON-state in the one frame.

In an electro-optical device according to an aspect of the present disclosure, the first period may be from 0.3 times to 0.6 times the second period.

In an electro-optical device according to an aspect of the present disclosure, an area of the first light-emitting element may be the same as an area of the second light-emitting element.

An electro-optical device according to an aspect of the present disclosure includes a third pixel configured to emit light in a third wavelength region shorter than the first wavelength region and longer than the second wavelength region, wherein the third pixel includes a third light-emitting element, and a third light-emitting control transistor corresponding to the third light-emitting element, and a third period in which the third light-emitting control transistor is in an ON-state in the one frame may be shorter than the second period and longer than the first period.

In an electro-optical device according to an aspect of the present disclosure, an area of the first light-emitting element, an area of the second light-emitting element, and an area of the third light-emitting element may be the same.

An image display device according to an aspect of the present disclosure may have the following configuration.

An image display device according to an aspect of the present disclosure includes an optical module according to an aspect of the present disclosure, or an electro-optical device according to an aspect of the present disclosure.

What is claimed is:
1. An optical module, comprising:
a first electro-optical device having
a first light-emitting element emitting light including a first wavelength region and
a first light-emitting control transistor provided corresponding to the first light-emitting element, a source or drain of the first light-emitting control transistor being electrically coupled to an anode of the first light-emitting element;
a second electro-optical device having
a second light-emitting element emitting light including a second wavelength region shorter than the first wavelength region and
a second light-emitting control transistor provided corresponding to the second light-emitting element, a source or drain of the second light-emitting control transistor being electrically coupled to an anode of the second light-emitting element; and
a prism configured to synthesize light emitted from the first electro-optical device, and light emitted from the second electro-optical device, wherein
a first period in which the first light-emitting control transistor is in an ON-state in one frame is shorter than a second period in which the second light-emitting control transistor is in an ON-state in the one frame.
2. The optical module according to claim 1, wherein the first period is from 0.3 times to 0.6 times the second period.
3. The optical module according to claim 1, wherein an area of the first light-emitting element is equal to an area of the second light-emitting element.
4. The optical module according to claim 2, wherein an area of the first light-emitting element is equal to an area of the second light-emitting element.
5. The optical module according to claim 1, further comprising:

a third electro-optical device having
a third light-emitting element emitting light including a third wavelength region shorter than the first wavelength region and longer than the second wavelength region and
a third light-emitting control transistor provided corresponding to the third light-emitting element, wherein
the prism synthesizes light emitted from the first electro-optical device, light emitted from the second electro-optical device, and light emitted from the third electro-optical device, and
a third period in which the third light-emitting control transistor is in an ON-state in the one frame is shorter than the second period and longer than the first period.

6. The optical module according to claim 2, further comprising:
a third electro-optical device having
a third light-emitting element emitting light including a third wavelength region shorter than the first wavelength region and longer than the second wavelength region and
a third light-emitting control transistor provided corresponding to the third light-emitting element, wherein
the prism synthesizes light emitted from the first electro-optical device, light emitted from the second electro-optical device, and light emitted from the third electro-optical device, and
a third period in which the third light-emitting control transistor is in an ON-state in the one frame is shorter than the second period and longer than the first period.

7. The optical module according to claim 5, wherein an area of the first light-emitting element, an area of the second light-emitting element, and an area of the third light-emitting element are equal.

8. The optical module according to claim 6, wherein an area of the first light-emitting element, an area of the second light-emitting element, and an area of the third light-emitting element are equal.

9. An electro-optical device, comprising:
a first pixel configured to emit light including a first wavelength region; and
a second pixel configured to emit light including a second wavelength region shorter than the first wavelength region, wherein
the first pixel includes
a first light-emitting element and
a first light-emitting control transistor provided corresponding to the first light-emitting element, a source or drain of the first light-emitting control transistor being electrically coupled to an anode of the first light-emitting element,
the second pixel includes
a second light-emitting element and
a second light-emitting control transistor provided corresponding to the second light-emitting element, a source or drain of the second light-emitting control transistor being electrically coupled to an anode of the second light-emitting element, and
a first period in which the first light-emitting control transistor is in an ON-state in one frame is shorter than a second period in which the second light-emitting control transistor is in an ON-state in the one frame.

10. The electro-optical device according to claim 9, wherein
the first period is from 0.3 times to 0.6 times the second period.

11. The electro-optical device according to claim 9, wherein
an area of the first light-emitting element is equal to an area of the second light-emitting element.

12. The electro-optical device according to claim 10, wherein
an area of the first light-emitting element is equal to an area of the second light-emitting element.

13. The electro-optical device according to claim 9, further comprising:
a third pixel configured to emit light including a third wavelength region shorter than the first wavelength region and longer than the second wavelength region, wherein
the third pixel includes
a third light-emitting element and
a third light-emitting control transistor provided corresponding to the third light-emitting element, and
a third period in which the third light-emitting control transistor is in an ON-state in the one frame is shorter than the second period and longer than the first period.

14. The electro-optical device according to claim 10, further comprising:
a third pixel configured to emit light including a third wavelength region shorter than the first wavelength region and longer than the second wavelength region, wherein
the third pixel includes
a third light-emitting element and
a third light-emitting control transistor provided corresponding to the third light-emitting element, and
a third period in which the third light-emitting control transistor is in an ON-state in the one frame is shorter than the second period and longer than the first period.

15. The electro-optical device according to claim 13, wherein
an area of the first light-emitting element, an area of the second light-emitting element, and an area of the third light-emitting element are equal.

16. The electro-optical device according to claim 14, wherein
an area of the first light-emitting element, an area of the second light-emitting element, and an area of the third light-emitting element are equal.

17. An image display device comprising the optical module according to claim 1.

18. An image display device comprising the electro-optical device according to claim 9.

* * * * *